United States Patent
Kimura et al.

(10) Patent No.: US 7,827,446 B2
(45) Date of Patent: Nov. 2, 2010

(54) FAILURE RECOVERY SYSTEM AND SERVER

(75) Inventors: Hiroyasu Kimura, Chigasaki (JP); Takahisa Miyamoto, Yokohama (JP)

(73) Assignee: Alaxala Networks Corporation, Kawasaki (JP)

( * ) Notice: Subject to any disclaimer, the term of this patent is extended or adjusted under 35 U.S.C. 154(b) by 688 days.

(21) Appl. No.: 11/680,868

(22) Filed: Mar. 1, 2007

(65) Prior Publication Data

US 2007/0220303 A1    Sep. 20, 2007

(30) Foreign Application Priority Data

Mar. 2, 2006  (JP) ............... 2006-056257
Oct. 6, 2006  (JP) ............... 2006-274639

(51) Int. Cl.
*G06F 11/00* (2006.01)
(52) U.S. Cl. ............... 714/43; 714/4; 714/26; 714/48
(58) Field of Classification Search ............ 714/4, 714/43, 48, 26
See application file for complete search history.

(56) References Cited

U.S. PATENT DOCUMENTS 5,666,481 A * 9/1997 Lewis ............... 714/4
6,006,016 A * 12/1999 Faigon et al. ............ 714/48
7,412,626 B2 * 8/2008 Wood et al. ............ 714/38
7,415,637 B2 * 8/2008 Suzuki et al. ............ 714/47
2005/0081118 A1 * 4/2005 Cheston et al. ............ 714/47
2007/0260911 A1 * 11/2007 Marilly et al. ............ 714/4

FOREIGN PATENT DOCUMENTS

JP      10-303897      11/1998
JP       3099770       8/2000
JP      2002-328894    11/2002

* cited by examiner

*Primary Examiner*—Philip Guyton
(74) *Attorney, Agent, or Firm*—Mattingly & Malur, P.C.

(57) ABSTRACT

A server 200 includes a scenario table in which object to-be-monitored information that indicates one or more network devices A, B and C being objects for failure recovery, failure information for identifying contents of failures, countermeasure information against failures, and frequency information that indicates the number of times of the recoveries from the failures based on the countermeasure information are correspondingly stored. The network device A 300 detects the failure of the network device itself and transmits a failure event to the server 200. The server 200 selects the countermeasure information item in descending order of the frequency information items, by reference to the scenario table, and transmits the selected countermeasure information item to the network device A 300. The server 200 repeats the selections and transmissions of the pertinent information item until the reception of the failure event from the network device A 300 stops.

6 Claims, 24 Drawing Sheets

CLIENT (SCENARIO INPUT SCREEN)

SCENARIO — 121

| PERTINENT FUNCTION | OBJECT TO-BE-MONITORED | FAILURE INFORMATION | COUNTERMEASURE METHOD |
|---|---|---|---|
| ROUTING | NETWORK DEVICE A OR B | FREQUENT OCCURRENCES OF ROUTE LEARNING | COST +10 INCREASE |

237

TRANSMIT SCENARIO — 101

FIG. 4 A

CLIENT (SCENARIO LIST DISPLAY SCREEN)

SCENARIO — 122

| PERTINENT FUNCTION | OBJECT TO-BE-MONITORED | FAILURE INFORMATION | COUNTERMEASURE METHOD | FREQUENCY INFORMATION |
|---|---|---|---|---|
| ROUTING | NETWORK DEVICE A OR B | FREQUENT OCCURRENCES OF ROUTE LEARNING | COST +10 INCREASE | 0 |
| ROUTING | NETWORK DEVICE A OR B | FREQUENT OCCURRENCES OF ROUTE LEARNING | COST +20 INCREASE | 0 |
| ROUTING | NETWORK DEVICE A OR C | FREQUENT OCCURRENCES OF ROUTE LEARNING | COST +30 INCREASE | 0 |
| ROUTING | NETWORK DEVICE A | FREQUENT OCCURRENCES OF ROUTE LEARNING | LEARNING TIME INCREASE +10 | 0 |
| ROUTING | NETWORK DEVICE A | FREQUENT OCCURRENCES OF ROUTE LEARNING | LEARNING TIME INCREASE +20 | 0 |

SCENARIO TABLE

| PERTINENT FUNCTION | OBJECT TO-BE-MONITORED | FAILURE INFORMATION | COUNTERMEASURE METHOD | FREQUENCY INFORMATION |
|---|---|---|---|---|
| ROUTING | NETWORK DEVICE A OR B | FREQUENT OCCURRENCES OF ROUTE LEARNING | COST +10 INCREASE | 0 |
| ROUTING | NETWORK DEVICE A OR B | FREQUENT OCCURRENCES OF ROUTE LEARNING | COST +20 INCREASE | 0 |
| ROUTING | NETWORK DEVICE A OR C | FREQUENT OCCURRENCES OF ROUTE LEARNING | COST +30 INCREASE | 0 |
| ROUTING | NETWORK DEVICE A | FREQUENT OCCURRENCES OF ROUTE LEARNING | LEARNING TIME INCREASE +10 | 0 |
| ROUTING | NETWORK DEVICE A | FREQUENT OCCURRENCES OF ROUTE LEARNING | LEARNING TIME INCREASE +20 | 0 |
| ROUTING | NETWORK DEVICE A | FREQUENT OCCURRENCES OF ROUTE LEARNING | LEARNING TIME INCREASE +30 | 0 |
| L2 REDUNDANCY | NETWORK DEVICES A AND B | DOUBLE MASTER | NETWORK DEVICE A → MASTER<br>NETWORK DEVICE B → BACKUP | 0 |
| L2 REDUNDANCY | NETWORK DEVICES A AND B | DOUBLE MASTER | NETWORK DEVICE A → BACKUP<br>NETWORK DEVICE B → MASTER | 0 |
| L2 REDUNDANCY | NETWORK DEVICES A AND B | DOUBLE BACKUP | NETWORK DEVICE A → MASTER<br>NETWORK DEVICE B → BACKUP | 0 |
| L2 REDUNDANCY | NETWORK DEVICES A AND B | DOUBLE BACKUP | NETWORK DEVICE A → BACKUP<br>NETWORK DEVICE B → MASTER | 0 |
| MULTICAST ROUTING | NETWORK DEVICE A AND NETWORK DEVICE B OR C | INCOMMUNICABLE | RP SETTING OF NETWORK DEVICE A→NO<br>RP SETTING OF NETWORK DEVICE B→YES<br>RP SETTING OF NETWORK DEVICE C→NO | 0 |
| MULTICAST ROUTING | NETWORK DEVICE A OR NETWORK DEVICES B AND C | INCOMMUNICABLE | RP SETTING OF NETWORK DEVICE A→NO<br>RP SETTING OF NETWORK DEVICE B→NO<br>RP SETTING OF NETWORK DEVICE C→YES | 0 |

FIG. 5

SCENARIO CANDIDATE LIST

| PERTINENT FUNCTION | OBJECT TO-BE-MONITORED | FAILURE INFORMATION | COUNTERMEASURE METHOD | FREQUENCY INFORMATION |
|---|---|---|---|---|
| ROUTING | NETWORK DEVICE A OR B | FREQUENT OCCURRENCES OF ROUTE LEARNING | COST +10 INCREASE | 0 |
| ROUTING | NETWORK DEVICE A OR B | FREQUENT OCCURRENCES OF ROUTE LEARNING | COST +20 INCREASE | 3 |
| ROUTING | NETWORK DEVICE A OR C | FREQUENT OCCURRENCES OF ROUTE LEARNING | COST +30 INCREASE | 5 |
| ROUTING | NETWORK DEVICE A | FREQUENT OCCURRENCES OF ROUTE LEARNING | LEARNING TIME INCREASE+10 | 4 |
| ROUTING | NETWORK DEVICE A | FREQUENT OCCURRENCES OF ROUTE LEARNING | LEARNING TIME INCREASE+20 | 0 |
| ROUTING | NETWORK DEVICE A | FREQUENT OCCURRENCES OF ROUTE LEARNING | LEARNING TIME INCREASE+30 | 2 |

236: SCENARIO

FIG. 6

SCENARIO CANDIDATE LIST IN L2 REDUNDANCY

SCENARIO CANDIDATE LIST

| PERTINENT FUNCTION | OBJECT TO-BE-MONITORED | FAILURE INFORMATION | COUNTERMEASURE METHOD | FREQUENCY INFORMATION |
|---|---|---|---|---|
| L2 REDUNDANCY | NETWORK DEVICES A AND B | DOUBLE MASTER | NETWORK DEVICE A → MASTER<br>NETWORK DEVICE B → BACKUP | 3 |
| L2 REDUNDANCY | NETWORK DEVICES A AND B | DOUBLE MASTER | NETWORK DEVICE A → BACKUP<br>NETWORK DEVICE B → MASTER | 4 |
| L2 REDUNDANCY | NETWORK DEVICES A AND B | DOUBLE BACKUP | NETWORK DEVICE A → MASTER<br>NETWORK DEVICE B → BACKUP | 1 |
| L2 REDUNDANCY | NETWORK DEVICES A AND B | DOUBLE BACKUP | NETWORK DEVICE A → BACKUP<br>NETWORK DEVICE B → MASTER | 5 |

STATUS ALTERATION DECISION TABLE

BEFORE STATUS ALTERATION

| NETWORK DEVICE A | NETWORK DEVICE B |
|---|---|
| MASTER | MASTER |

FIG. 15 A

AFTER STATUS ALTERATION

| NETWORK DEVICE A | NETWORK DEVICE B |
|---|---|
| BACKUP | BACKUP |

FIG. 15 B

AFTER COUNTERMEASURE

| NETWORK DEVICE A | NETWORK DEVICE B |
|---|---|
| BACKUP | MASTER |

FIG. 15 C

SCENARIO CANDIDATE LIST IN MULTICAST ROUTING

SCENARIO CANDIDATE LIST

| PERTINENT FUNCTION | OBJECT TO-BE-MONITORED | FAILURE INFORMATION | COUNTERMEASURE METHOD | FREQUENCY INFORMATION |
|---|---|---|---|---|
| MULTICAST ROUTING | NETWORK DEVICE D | RP HAS FAILED TO BE SEEN FROM DEVICE D | RP SETTING OF NETWORK DEVICE A→NO<br>RP SETTING OF NETWORK DEVICE B→YES<br>RP SETTING OF NETWORK DEVICE C→NO | 2 |
| MULTICAST ROUTING | NETWORK DEVICE D | RP HAS FAILED TO BE SEEN FROM DEVICE D | RP SETTING OF NETWORK DEVICE A→NO<br>RP SETTING OF NETWORK DEVICE B→NO<br>RP SETTING OF NETWORK DEVICE C→YES | 1 |

SCENARIO TABLE WITH MANUAL DATA ADDED

| PERTINENT FUNCTION | OBJECT TO-BE-MONITORED | FAILURE INFORMATION | COUNTERMEASURE METHOD | FREQUENCY INFORMATION | MANUAL DATA |
|---|---|---|---|---|---|
| ROUTING | NETWORK DEVICE A OR B | FREQUENT OCCURRENCES OF ROUTE LEARNING | COST +10 INCREASE | 0 | MANUAL DATA RELEVANT TO ROUTE LEARNING |
| ROUTING | NETWORK DEVICE A OR B | FREQUENT OCCURRENCES OF ROUTE LEARNING | COST +20 INCREASE | 0 | MANUAL DATA RELEVANT TO ROUTE LEARNING |
| ROUTING | NETWORK DEVICE A OR C | FREQUENT OCCURRENCES OF ROUTE LEARNING | COST +30 INCREASE | 0 | MANUAL DATA RELEVANT TO ROUTE LEARNING |
| ROUTING | NETWORK DEVICE A | FREQUENT OCCURRENCES OF ROUTE LEARNING | LEARNING TIME INCREASE +10 | 0 | MANUAL DATA RELEVANT TO ROUTE LEARNING |
| ROUTING | NETWORK DEVICE A | FREQUENT OCCURRENCES OF ROUTE LEARNING | LEARNING TIME INCREASE +20 | 0 | MANUAL DATA RELEVANT TO ROUTE LEARNING |
| ROUTING | NETWORK DEVICE A | FREQUENT OCCURRENCES OF ROUTE LEARNING | LEARNING TIME INCREASE +30 | 0 | MANUAL DATA RELEVANT TO ROUTE LEARNING |
| L2 REDUNDANCY | NETWORK DEVICES A AND B | DOUBLE MASTER | NETWORK DEVICE A → MASTER<br>NETWORK DEVICE B → BACKUP | 0 | MANUAL DATA RELEVANT TO DOUBLE MASTER |
|  |  |  |  |  |  |

236: SCENARIO

FIG. 21

EXAMPLE OF RELATION BETWEEN
MAINTENANCE MANUAL AND SCENARIO TABLE

| PERTINENT FUNCTION | OBJECT TO-BE-MONITORED | FAILURE INFORMATION | COUNTERMEASURE METHOD | FREQUENCY INFORMATION | MANUAL DATA |
|---|---|---|---|---|---|
| ROUTING | NETWORK DEVICE A OR B | FREQUENT OCCURRENCES OF ROUTE LEARNING | COST +10 INCREASE | 0 | MANUAL RELEVANT TO ROUTE LEARNING |

230 231 232 233 234 235 2000

800: MAINTENANCE MANUAL

FIG. 22

MANUAL DATA

```
<type>
ROUTE INFORMATION
</type>
<doc>
(RELEVANT DOCUMENT ENTERS)
</doc>
 ▪
 ▪
 ▪
 ▪
```

700: MANUAL DATA

FIG. 23

MAINTENANCE MANUAL

```
<?xml version="1.0" encoding="utf-8"?>
<manual>
<FUNCTION>
 ROUTING
</FUNCTION>
<FAILURE>
FREQUENT OCCURRENCES OF ROUTE LEARNING
</FAILURE>
<type>
 ROUTE INFORMATION
</type>
<doc>
 (RELEVANT DOCUMENT ENTERS)
</doc>
 .
 .
 .
 .
</manual>
```

800: MAINTENANCE MANUAL

FIG. 24

FAILURE RECOVERY SYSTEM AND SERVER

BACKGROUND OF THE INVENTION

1. Field of the Invention

The present invention relates to a failure recovery system and a server. More particularly, it relates to a failure recovery system and a server in a network control in which, from among countermeasure candidates against failures as have been accumulated in a network operation management, an effective countermeasure is selected on the basis of priority degrees learnt automatically, thereby to recover from a failure.

2. Description of the Related Art

In a conventional network management, a countermeasure method in the case where a failure has occurred in a network has been such that a highly skilled operator directly deals with each failure, or that operating methods for recovering the network from simple failures are prepared as a script on a computer beforehand, whereupon an operator selects the corresponding operating method. In the case of the former method, however, the countermeasure method depends upon the skill of the operator, so that a standardized operation is difficult to be performed, and the human cost of the operator himself/herself tends to become very high. Besides, in the case of the latter, the operating methods for eliminating the failures can be held beforehand, and hence, the operator is relieved from the necessity of dealing with the failures in failure units. However, which of the failures has occurred needs to be specified and judged, and a complete automation has not been made.

Besides, a failure information management scheme in a network supervision system has been disclosed (refer to, for example, Japanese Patent No. 3,099,770 and Japanese Patent No. 3,618,682). This scheme includes a failure information management table in which failure sorts that might occur, influence priority degrees that are previously determined in correspondence with the respective failure sorts and in accordance with the magnitudes of influence degrees exerted by the corresponding failures, and influence failure sorts that might be exerted by the corresponding failures are predetermined and stored. Besides, in response to the occurrences of a plurality of failures, the failure sort forming the cause of the failures is specified by reference to the failure information management table, and in accordance with the influence priority degrees and the influence failure sorts which correspond to the respective failure sorts having occurred.

SUMMARY OF THE INVENTION

With the method of Japanese Patent No. 3,618,682, however, in the present-day network wherein the changes of a configuration constituted by the combination of various network protocols and network devices are always anticipated, the priority degrees need to be always changed, and it becomes difficult to specify the failure sort on the basis of the fixed priority degrees determined beforehand. Besides, in an environment wherein a large number of complicated network control protocols are used as in the present-day network, the tuning of the network needs to be always done. In actuality, however, the tuning is often a succession of simple operations such as fine parameter adjustments, so that human and temporal costs have increased.

Besides, in the invention of Japanese Patent No. 3,618,682, it is the principal object to assist a user in dealing with a failure while the user is referring to a manual which a system has automatically generated in response to a security failure event. However, the combination of manuals for fragmentary countermeasures against supposed failures is merely presented to the user, and failures not supposed are difficult of solutions.

In view of the above drawbacks, the present invention has for its object to provide a failure recovery system and a server in which priority degrees conforming to an actual network operation are automatically learnt as frequency information, whereby a scenario containing a countermeasure method and registered beforehand is selected so as to automatically eliminate a failure. Besides, the invention has for its object to provide a failure recovery system, etc. in a network control as can decrease the cost of a network operation.

Besides, it is an object of the invention to decrease human and temporal costs. Further, it is an object of the invention to try every possible means unlike the radical solution of a network failure, whereby an operator gains a time period until he/she actually deals with the failure. Still further, it is an object of the invention to automatically execute supposed countermeasures before an operator deals with a failure, whereby the operator deals with the failure more effectively.

(1) An automatic failure recovery system includes a network device, a server, and a client device (client). The network device has the function of communicating with one or more other network devices which constitute a network, and converting a constitution definition template which describes a physical or logical connectional relation, or a physical connectional relation and a selection priority degree on a logical connection, into a constitution definition for defining the function of the network device, and then outputting the constitution definition. Besides, the network device has the function of transmitting a device failure event which is the notification of a failure or a status change ascribable to the function of the network device.

The server communicates with one or more network devices, and registers in a scenario table, scenarios each of which is the combination of a pertinent function corresponding to that failure of a function which a user wants to deal with, among failures ascribable to the function/functions of one or more network devices or failures ascribable to status changes, an object to-be-monitored, failure information, a countermeasure method for coping with the failure, and frequency information indicating the selection frequency of the countermeasure method. Besides, the server receives the device failure event transmitted from one or more network devices, and it selects the corresponding countermeasure methods existing in the scenario table, in the order of the frequency information items. The server has the function of generating the constitution definition template of one network device or each of more network devices, and transmitting the generated template to one or more network devices. Also, the server has the function of updating the frequency information of the scenario table in accordance with the success result of the countermeasure method. Further, the server has the function of successively generating the constitution definition templates on the basis of the countermeasure methods in the scenario table, until the reception of the same device failure event information from the device stops, and transmitting the generated template to the device.

The client is an external interface for registering the scenarios in the scenario table of the server or displaying a scenario table list.

(2) In this system, the constitution definition template which describes the selection priority degree of the physical connection relation or logical connection relation of one or more network devices or the relation of the physical connection and logical connection thereof has a descriptive method based on a format whose grammar definition is afforded beforehand.

(3) In this system, regarding the constitution definition template and the constitution definition, the formats of the grammar definition of the constitution definition template and the constitution definition have fixed conversion rules therebetween.

(4) In this system, the client which is the external interface for registering the scenarios in the scenario table of the server or displaying the scenario table list is connected with the server through the communications between processes which incarnate functions in the network or the server.

(5) In this system, the function of transmitting the device failure event which is the information of a failure ascribable to a network-relayed function reflected by the constitution definition, or the status change of the function, contains a communicational transmission function which is included in the network device, or a transmission function which is based on call-back from the server or the network device.

(6) In this system, the object to-be-monitored describes one or more network devices or functional parts in the devices, in terms of logical relations.

(7) In this system, scenario selections continue until all the countermeasure methods which correspond to failures registered in the scenario table by the user are executed in the order of the frequency information items, and in a case where the reception of the device failure event continues in spite of the nonexistence of any unselected scenario, a request for a manual countermeasure is notified to the user.

(8) The server in this system is communicable with the client through the network or interprocess communications, and it receives the device failure event transmitted from one or more devices, through the network. The server includes a device failure event reception program which receives the device failure event from the device, and a scenario table management program which extracts one or more scenario candidate lists meeting the pertinent function, the object to-be-monitored and the failure information, from the scenario table in accordance with the contents of the device failure event, and which manages the scenario candidate lists.

(9) In this system, as the frequency information order of the corresponding countermeasure methods existent in the scenario table, a sequence in which the countermeasure methods are selected on the basis of the frequency information is the descending order.

(10) A data processing method in this system is one which utilizes the frequency of uses employing a computer, and in which processes against a plurality of failures to be handled are executed with the frequency of the uses of the processing countermeasures utilized. That is, the data processing method is one utilizing the frequency of the uses, in which the computer updates and records the frequency of the uses of the selected processes to-be-handled, and in selecting the plurality of processes to-be-handled, the computer reads out the recorded frequency of the uses of the respective processes to-be-handled and utilizes the frequency as information for the selections.

(11) This system has a processing method in which the frequency of the uses of countermeasure methods against similar failures in the past is affixed as frequency information to the combinations of failure sorts and the countermeasure methods as have been registered as scenarios beforehand by a user, whereby a computer is permitted to select the methods to-be-handled on the basis of past examples.

(12) The client of this system is an external interface for registering the scenarios in a scenario table or displaying a scenario table list. This client has the function of displaying the scenario table list, and the function of transmitting the scenarios which the user registers.

(13) In this system, regarding the function of displaying the scenario table list, the display is directly utilized by a man being the user or is utilized by a program.

(14) The scenario table of this system is one which has the scenario list registered by the user. The scenario table contains a pertinent function area which holds the pertinent function of a device failure, an object to-be-monitored area which holds one or more device information items corresponding to the function that undergoes the occurrence of the failure, a failure information area which holds failure information, and a countermeasure method area which holds a countermeasure method for coping with the failure.

(15) In this system, the countermeasure method is a constitution definition template which describes the selection priority degree of the physical connection relation or logical connection relation of one or more network devices or the relation of the physical connection and logical connection thereof, and which is based on a format whose grammar definition is afforded beforehand.

(16) In this system, regarding the scenario table, in a case where the frequency information items of the scenarios registered in the scenario table are "0's", the sequence in which the scenarios are registered in the table becomes the order of selecting the scenarios.

(17) In this system, regarding the scenario table, in a case where the frequency information items of two or more scenarios registered in the scenario table have the same values, the sequence in which the scenarios are registered in the table becomes the order of selecting the scenarios.

(18) Regarding the device failure event, the execution of the scenario selected by the device failure event can be limited by the number of times of execution, and the number of times of execution can be defined in the client or the server.

(19) Regarding the device failure event, a time period for which the server continues to receive any specified device failure event can be limited, and the time period can be defined in the client or the server.

(20) This system has a processing method in which the frequency of the uses of countermeasure methods against similar failures in the past is affixed as frequency information to the combinations of failure sorts and the countermeasure methods as have been registered as scenarios beforehand by a user, whereby a computer is permitted to select the methods to-be-handled on the basis of past examples. The results of the selections by the computer can be saved as logs in the client, the server or a network device.

(21) Regarding the scenario table, items which constitute the scenarios of the scenario table can be extended.

According to the first solving means of this invention, there is provided a failure recovery system comprising:
one or more network devices constituting a network; and
a server connected to said network devices, and including a scenario table in which object to-be-monitored information that indicates said network device or devices being objects for failure recovery, failure information for identifying contents of failures, and countermeasure information against the failures, and frequency information that indicates the number of times of recoveries from the failures based on the countermeasure information are correspondingly stored;

wherein:

said network device detects the failure of said network device itself, and transmits to said server, a failure event which contains the object to-be-monitored information indicating said device itself, and the failure information for identifying content of the failure;

said server receives the failure event, searches for one or more countermeasure information items corresponding to the object to-be-monitored information and the failure information which are contained in the failure event, by reference to the scenario table, and selects from among the pertinent countermeasure information items, one countermeasure information item as to which the corresponding frequency information is the largest, or, is equal to or larger than a predetermined value;

said server transmits the selected countermeasure information item to said network device;

said network device receives the countermeasure information item, and reflects the countermeasure information item or alters its setting on the basis of the countermeasure information item; and when said server judges that the failure event is not received again within a predetermined time period since the transmission of the selected countermeasure information item, said server increases the frequency information item corresponding to the selected countermeasure information item, by reference to the scenario table.

According to the second solving means of this invention, there is provided a server comprising:

an interface for communicating with one or more network devices which constitute a network;

a scenario table in which object to-be-monitored information that indicates said network device or devices being objects for failure recoveries, failure information for identifying contents of failures, countermeasure information against the failures, and frequency information that indicates the number of times of recoveries from the failures based on the countermeasure information are correspondingly stored; and a processing unit;

wherein:

said processing unit receives through said interface, a failure event which is transmitted when said network device detects the failure, and which contains the object to-be-monitored information indicating said network device, and the failure information for identifying the content of the failure;

said processing unit searches for one or more countermeasure information items corresponding to the object to-be-monitored information and the failure information that are contained in the failure event, by reference to said scenario table, and selects from among the pertinent countermeasure information items, one countermeasure information item as to which the corresponding frequency information is the largest, or, is equal to or larger than a predetermined value;

said processing unit transmits the selected countermeasure information item to said network device through said interface; and in a case where the failure event is not received again within a predetermined time period since the transmission of the selected countermeasure information item, said processing unit increases the frequency information item corresponding to the selected countermeasure information item, by reference to said scenario table.

According to the third solving means of this invention, there is provided a failure recovery system comprising:

a first network device constituting a network;

a second network device connected to said first network device, and constituting the network; and a server connected to said first and second network devices, and including a scenario table in which object to-be-monitored information that indicates said first and second network devices being objects for recovery from a failure, failure information that is determined by a combination of a status of said first network device and a status of said second network device, countermeasure information against the failure, and frequency information that indicates the number of times of the recoveries from the failure based on the countermeasure information are correspondingly stored;

wherein:

said first network device transmits to said server, a first event which contains first object to-be-monitored information indicating said device itself, and first status information indicating the status of said device itself;

said second network device transmits to said server, a second event which contains second object to-be-monitored information indicating said device itself, and second status information indicating the status of said device itself;

said server receives the first and second events, judges existence or nonexistence of the failure on the basis of the first status information and the second status information, and finds failure information;

said server searches for one or more countermeasure information items which correspond to the first and second object to-be-monitored information items respectively contained in the first and second events, and the found failure information, by reference to the scenario table, and selects from among the pertinent countermeasure information items, one countermeasure information item as to which the corresponding frequency information is the largest, or, is equal to or larger than a predetermined value;

said server transmits the selected countermeasure information item to said first and second network devices, respectively;

said first and second network devices receive the countermeasure information item, and reflect said countermeasure information item or alter their settings on the basis of the countermeasure information item, respectively; and when the failure is avoided, said server increases the frequency information item corresponding to the selected countermeasure information item, by reference to the scenario table.

According to the fourth solving means of this invention, there is provided a server comprising:

an interface for communicating with first and second network devices which constitute a network;

a scenario table in which object to-be-monitored information that indicate the first and second network devices being objects for recovery from a failure, failure information that is determined by a combination of a status of the first network device and a status of the second network device, countermeasure information against the failure, and frequency information that indicates the number of times of the recoveries from the failure based on the countermeasure information are correspondingly stored; and a processing unit;

wherein:

said processing unit receives a first event which contains first object to-be-monitored information indicating the first network device, and first status information indicating the status of the first network device, from the first network device and through said interface;

said processing unit receives a second event which contains second object to-be-monitored information indicating the second network device, and second status information indicating the status of the second network device, from the second network device and through said interface;

said processing unit judges existence or nonexistence of the failure on the basis of the first status information and the second status information, and finds failure information;

said processing unit searches for one or more countermeasure information items which correspond to the first and second object to-be-monitored information items respectively contained in the first and second events, and the found failure information, by reference to said scenario table, and selects from among the pertinent countermeasure information items, one countermeasure information item as to which the corresponding frequency information is the largest or, is equal to or larger than a predetermined value;

said processing unit transmits the selected countermeasure information item to the first and second network devices through said interface, respectively; and when the failure is avoided, said processing unit increases the frequency information corresponding to the selected countermeasure information item, by reference to said scenario table.

According to the fifth solving means of this invention, there is provided a failure recovery system comprising:

a first network device constituting a network;

a second network device constituting the network;

a third network device connected to the network through said first network device, and connected to the network through said second network device; and a server connected to said first and second network devices, and including a scenario table in which object to-be-monitored information that indicates the network device or devices being objects for failure recovery, failure information for identifying contents of failures, countermeasure information against the failures, and frequency information that indicates the number of times of recoveries from the failures based on the countermeasure information are correspondingly stored;

wherein:

when said third network device detects that a failure has occurred in a transfer to the network, due to the failure of said first or second network device, said third network device transmits to said server, a failure event which contains the object to-be-monitored information indicating said device itself, and failure information for identifying the failure of a transfer function;

said server receives the failure event, searches for one or more countermeasure information items corresponding to the object to-be-monitored information and the failure information which are contained in the failure event, by reference to the scenario table, and selects from among the pertinent countermeasure information items, one countermeasure information item as to which the corresponding frequency information is the largest, or, is equal to or larger than a predetermined value;

said server transmits the countermeasure information item to said first and second network devices in conformity with the selected countermeasure information item;

said first and second network devices receive the countermeasure information item, and reflect the countermeasure information item or alter their settings on the basis of the countermeasure information item; and when said server does not receive the failure event again within a predetermined time period since the transmission of the selected countermeasure information item, said server increases the frequency information corresponding to the selected countermeasure information item, by reference to the scenario table.

According to the sixth solving means of this invention, there is provided a server comprising:

an interface for communicating with first, second and third network devices which constitute a network;

a scenario table in which object to-be-monitored information that indicates said network device or devices being objects for failure recovery, failure information for identifying contents of failures, countermeasure information against the failures, and frequency information that indicates the numbers of times of recoveries from the failures based on the countermeasure information are correspondingly stored; and a processing unit;

wherein:

said processing unit receives through said interface, a failure event which is transmitted when the third network device detects that a failure has occurred in a transfer to the network, due to the failure of the first or second network device, and which contains the object to-be-monitored information indicating the third network device, and the failure information for identifying the failure of a transfer function;

said processing unit searches for one or more countermeasure information items which correspond to the object to-be-monitored information and the failure information that are contained in the failure event, by reference to said scenario table, and selects from among the pertinent countermeasure information items, one countermeasure information item as to which the corresponding frequency information is the largest, or, is equal to or larger than a predetermined value;

said processing unit transmits the countermeasure information item to the first and second network devices through said interface, in conformity with the selected countermeasure information item; and when the failure event is not received again within a predetermined time period since the transmission of the selected countermeasure information item, said processing unit increases the frequency information corresponding to the selected countermeasure information item, by reference to said scenario table.

BRIEF DESCRIPTION OF THE DRAWINGS

FIGS. 4A and 4B are diagrams showing the scenario input screen and scenario list display screen of a client, respectively;

FIG. 5 is a diagram showing a scenario table;

FIG. 6 is a diagram showing a scenario candidate list;

FIG. 13 shows a scenario candidate list in L2 redundancy;

FIGS. 15A-15C show a status transition table serving as the reference of a status alteration decision;

FIG. 18 shows a scenario candidate list in multicast routing;

FIG. 21 shows a scenario table in which the items of manual data are added;

FIG. 22 is a diagram showing the generation of a maintenance manual from the information of the scenario table;

FIG. 23 shows a concrete example of the manual data; and

FIG. 24 shows a concrete example of the generated maintenance manual.

DETAILED DESCRIPTION OF THE INVENTION

1. First Embodiment

In this embodiment, an embodiment which concerns routing will be described.

Figure 1:
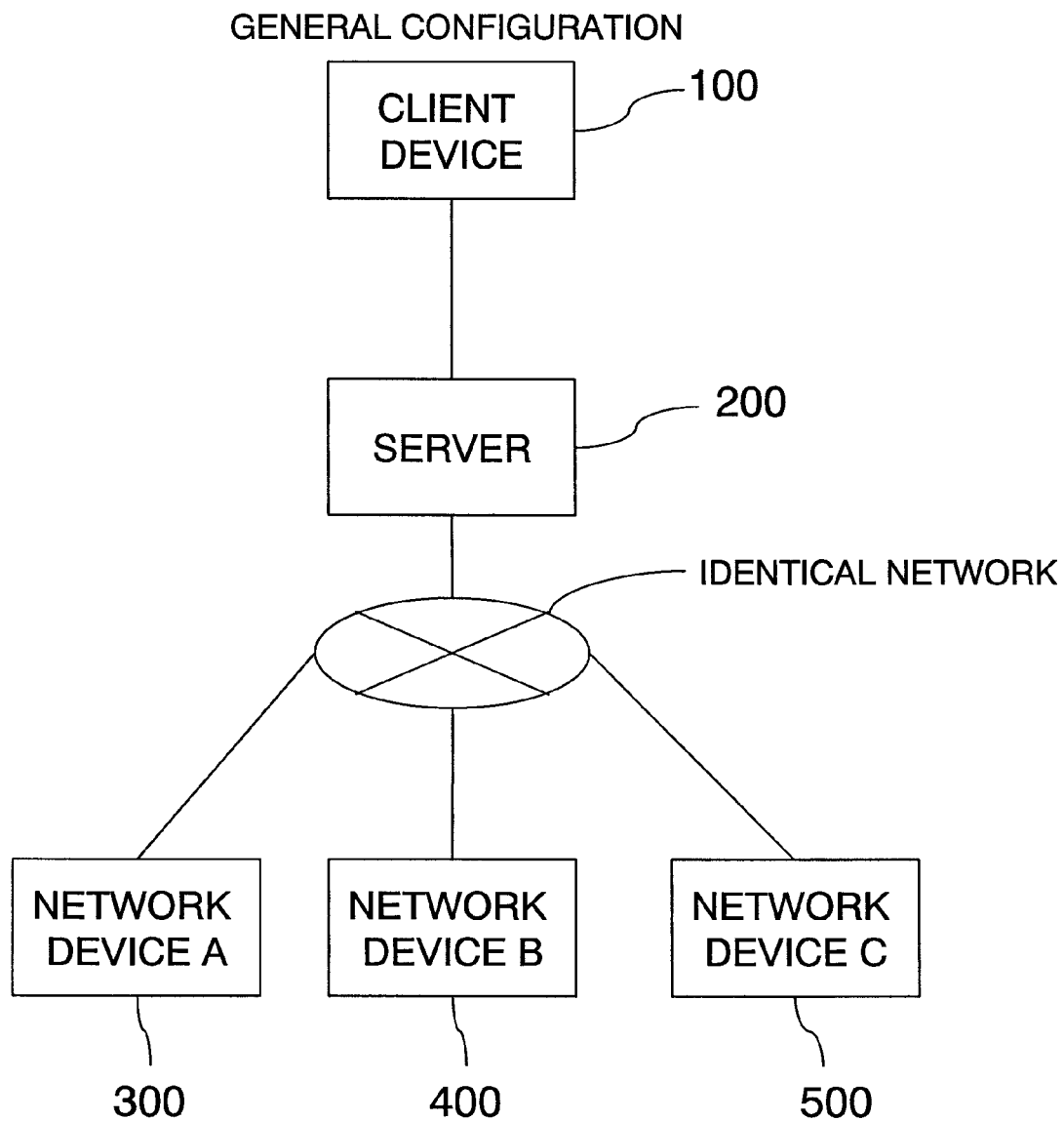
FIG. 1 is a diagram showing the general configuration of a first embodiment.

FIG. 1 is the general configurational diagram of an automatic failure recovery system according to this embodiment.

The automatic failure recovery system includes a client device 100, a server 200, and a network device. By way of example, the recovery system can include a plurality of network devices. In the illustrated example, a network device A 300, a network device B 400 and a network device C 500 are included.

The client device (hereinbelow, written as the "client") 100 is a device for an administrator who operates a network. The client 100 and the server 200 are connected through the network or interprocess communications. The server 200 and one or more network devices A 300, B 400 and C 500 are connected by an identical network. The "network device" is a device constituting the network, and it is, for example, a router or a switch. Besides, a routing protocol is activated in the identical network. One or more network devices are joined with the server 200 through the network, and the network devices may be in any number. Supposing that failures against from the client 100 into the server 200 can occur in the network device A 300, B 400 or C 500, the user (administrator) registers scenarios containing countermeasures against the failures to the client 100 beforehand. The client 100 displays the list of the registered scenarios on a display unit, and the user confirms that the scenarios have been registered in the server 200.

When the server 200 receives failure event information transmitted from the network device A 300, B 400 or C 500, it selects the corresponding scenario on the basis of frequency information. The frequency information indicates, for example, the numbers of times which the network device has recovered from the failure by countermeasure information. Besides, the server 200 creates a constitution definition template, and it transmits the created template to the network device A 300, B 400 or C 500 from which the failure event information has been received. The constitution definition template contains, for example, the countermeasure method in the selected scenario. The network device A 300, B 400 or C 500 having received the constitution definition template generates a constitution definition and reflects the constitution definition on its function. Thus, the countermeasure method of the selected scenario is reflected, or settings are altered in accordance with the countermeasure method.

After the server 200 has confirmed that the same device failure event is not transmitted within a predetermined time period from the network device A 300, B 400 or C 500, it updates by +1, the numeral value of the frequency information of the corresponding scenario of a scenario table registered therein. Besides, in a case where the reception of the device failure event is continuing, the server 200 selects the scenario as to which the value of the frequency information is the secondly largest. The selections of the scenarios registered by the user are repeated until the failure finishes. At the point of time when the failure has finished, the numerical value of the frequency information of the corresponding scenario is updated by +1.

Figure 2:
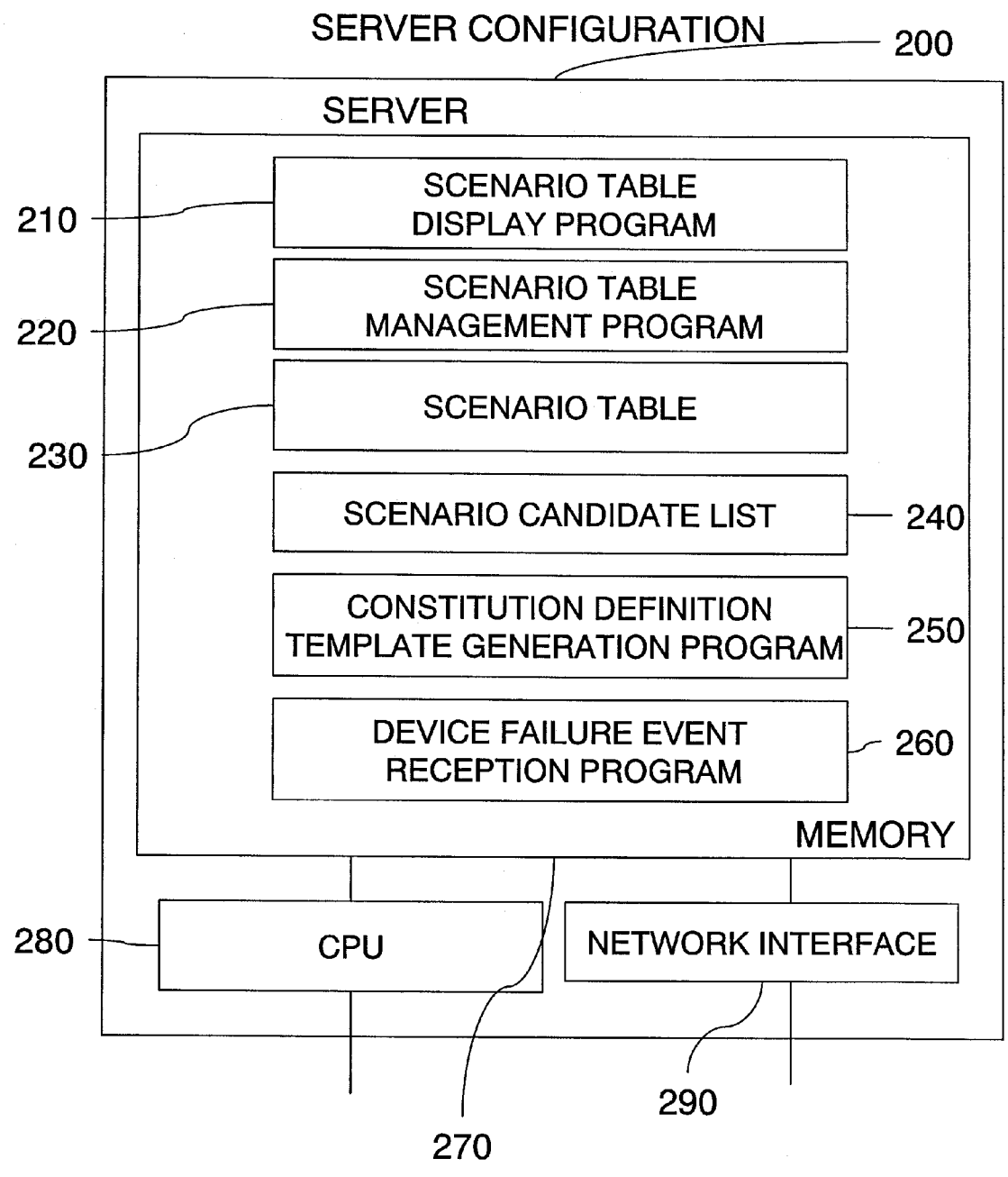
FIG. 2 is a diagram showing a configuration in the case where a server is incarnated using a CPU.

FIG. 2 is the configurational diagram of the server 200.

The server 200 includes a memory 270, a CPU 280, and a network interface 290 for the connection of this server with the network device or the client 100. The memory 270 has a scenario table display program 210, a scenario table management program 220, a scenario table 230, a scenario candidate list 240, a constitution definition template generation program 250, and a device failure event reception program 260.

The scenario table display program 210 is a program for displaying the contents of the scenario table 230 on the client 100. The scenario table management program 220 registers the scenario table 230, or extracts the scenario candidate list 240 from the scenario table 230. The scenario table 230 is a table for storing therein scenarios registered from the client 100. The detailed configuration of the scenario table 230 will be explained later. The scenario candidate list 240 is a list into which the scenario table 230 is narrowed down by a pertinent function. The constitution definition template generation program 250 generates a constitution definition template which is derived from a countermeasure method contained in the selected scenario, and it transmits the constitution definition template to the network device. The device failure event reception program 260 is a portion for receiving a device failure event which the network device A 300, B 400 or C 500 has transmitted.

The CPU 280 loads and runs the programs in the memory 270 by way of example. The network interface 290 is an interface for communicating with, for example, the network devices A, B and C and the client 100. Incidentally, although the scenario table 230 and the scenario candidate list 240 exist within the memory 270 in FIG. 2, they may well exist on an external storage device such as hard disk, or they may well exist on an external storage device which is accessed through a network or interprocess communications.

Figure 3:
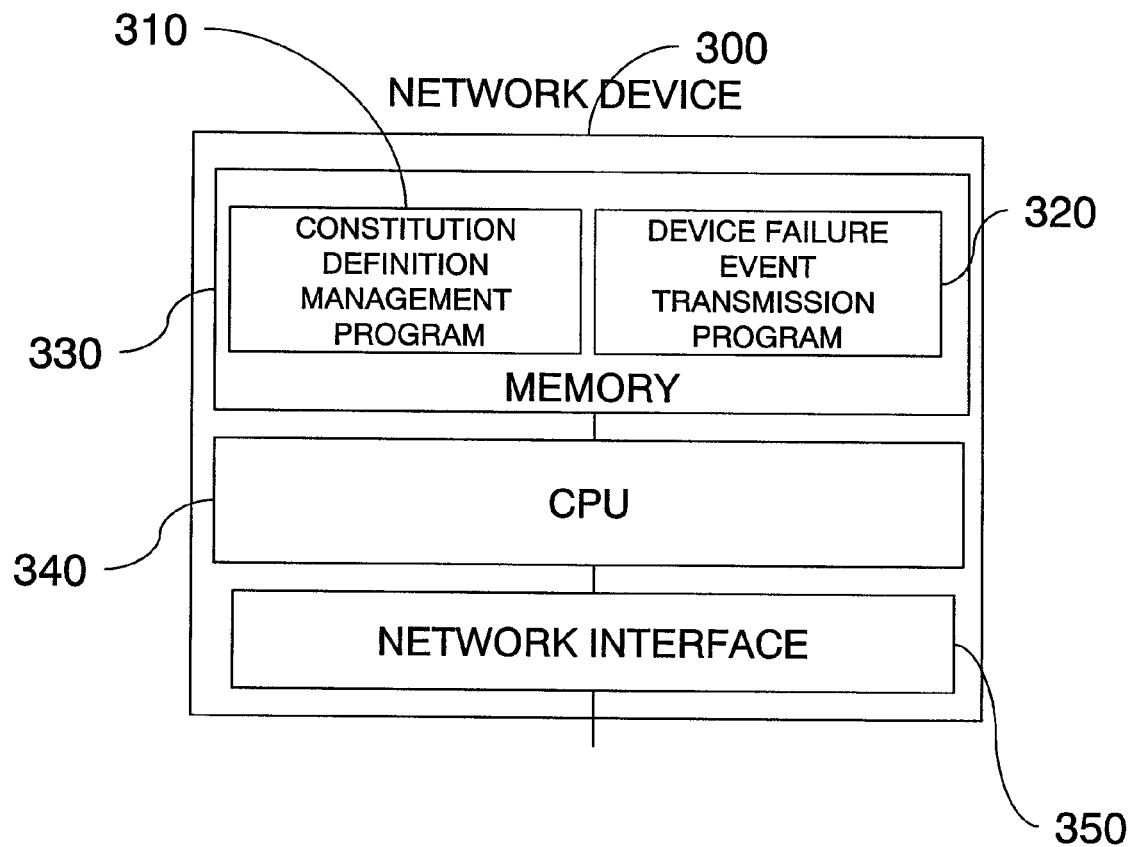
FIG. 3 is a diagram showing a configuration in the case where a network device is incarnated using a CPU.

FIG. 3 is the configurational diagram of the network device A 300. Incidentally, the configuration of the network device B 400 or C 500 is the same as that of the network device A 300. Besides, similar network devices may well be disposed in any number.

The network device A 300 includes a memory 330, a CPU 340, and a network interface 350. The single network interface 350 is shown here, but a plurality of network interfaces may well be disposed. The network interface 350 is an interface for communicating with, for example, the server 200. The memory 330 has a constitution definition management program 310 and a device failure event transmission program 320. The constitution definition management program 310 receives a constitution definition template from the server 200, and generates a constitution definition. The device failure event transmission program 320 transmits a device failure event having occurred in the network device A 300, to the server 200. The CPU 340 reads out and runs the programs in the memory 330.

Figure 20:
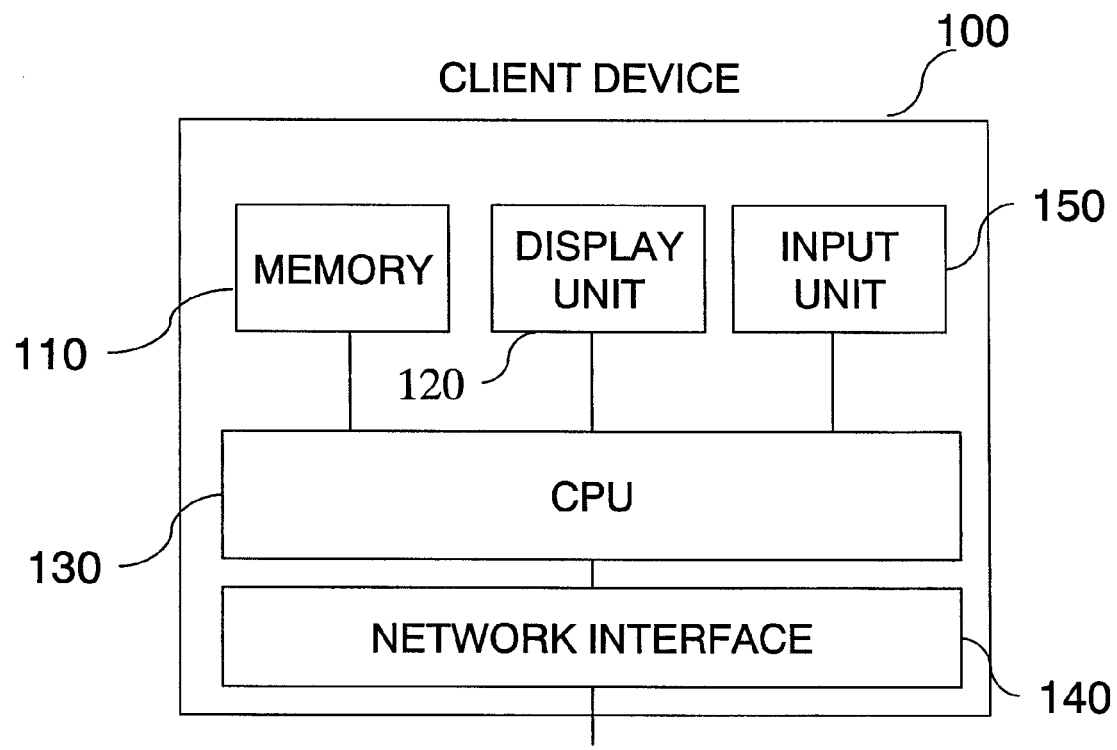
FIG. 20 is a configurational diagram of the client.

FIG. 20 is the configurational diagram of the client 100. The client 100 includes a memory 110, a display unit 120, a CPU 130, a network interface 140, and an input unit 150.

FIGS. 4A and 4B are diagrams showing examples of screens which are displayed on the display unit 120 of the client 100. By way of example, FIG. 4A shows a scenario input screen 121 which is a screen for registering scenarios in the client 100, while FIG. 4B shows a scenario list display screen 122 for displaying a scenario list registered after the scenarios have been registered. The scenario input screen 121 and the scenario list display screen 122 may be presented either in the identical client or in a plurality of clients.

The scenario input screen in FIG. 4A contains a button 101 for inputting, for example, the items of the scenarios and a command for transmitting the scenario. The scenario contains, for example, a pertinent function, an object to-be-monitored, failure information, and a countermeasure method. The client 100 displays the scenario input screen on the display unit 120, and the user (administrator) inputs the scenario from the input unit (for example, a keyboard) 150 in accordance with the display of the display unit 120. In registering the scenario into the server 200, the user pushes the button 101 for transmitting the scenario, whereby the client 100 transmits the inputted scenario to the server 200 (scenario registration request). In the example of FIG. 4A, the scenario 237 which contains data "routing", "network device A or B", "frequent occurrences of route learning" and "cost+10 increase" is transmitted to the server 200.

The scenario list display screen in FIG. 4B contains, for example, the scenario and frequency information. By way of example, when the new scenario 237 is registered in the server 200, the server 200 transmits the registered scenarios and frequency information to the client 100. The client 100 receives the scenarios and frequency information from the server 200, and displays them on the display unit 120.

FIG. 5 is the configurational diagram of the scenario table 230.

The scenario table 230 contains a pertinent function 231, an object to-be-monitored 232, failure information 233, a countermeasure method (countermeasure information) 234, and frequency information 235. The pertinent function 231 indicates which of functions incarnated by the network device is to be handled. The object to-be-monitored 232 is data which describe a condition where which of the network devices is an object for failure recovery when the server 200 has received a device failure event from one or more network devices. The failure information 233 indicates the sort of a failure. The countermeasure method 234 indicates a concrete countermeasure method. The frequency information 235 indicates how many times a scenario was selected to contribute to the recovery from the failure. In this embodiment, the contents 231-234 shall be collectively termed the "scenario 236".

In the illustrated scenario table 230, a plurality of scenarios for the pertinent functions of routing, L2 redundancy and multicast routing are registered by way of example. No scenario or a plurality of scenarios 236 is/are registered in the scenario table 230.

FIG. 6 is the configurational diagram of the scenario candidate list 240.

The scenario candidate list 240 is created in such a way that the corresponding scenarios 246 and frequency information are extracted by searching the scenario table 230 in terms of the pertinent function. The same items 241-245 as in the scenario table 230 in FIG. 5 exist in the scenario candidate list 240. The example of FIG. 6 is the scenario candidate list 240 of the pertinent function concerning the routing. Incidentally, the "cost" in the figures is a value which corresponds to, for example, links that are passed until a destination network is reached. By the way, the server 200 selects the scenario by reference to the scenario candidate list 240 extracted from the scenario table 230, but it may well select the scenario from the scenario table 230 by omitting the scenario candidate list 240. Besides, scenario tables 230 for the respective pertinent functions may well be disposed beforehand.

Figure 9:
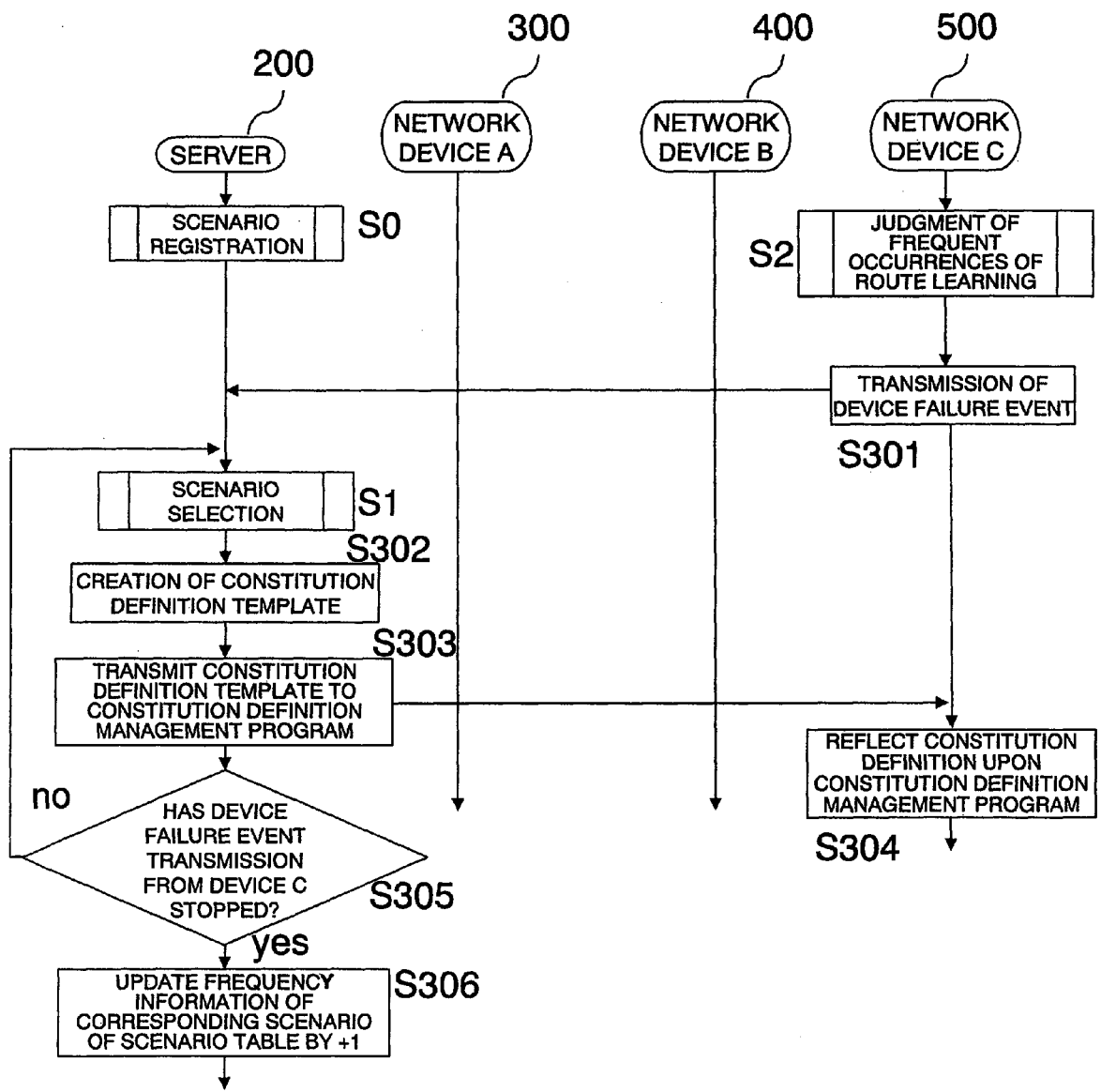
FIG. 9 is a system flow chart in the case where a routing function is used.

FIG. 9 shows a flow chart in the case where this embodiment is applied in the routing function.

First, the server 200 registers scenarios in the scenario table 230 beforehand (step S0). The network device C 500 which is using the routing function judges the frequent occurrences of route learning on the basis of logs which the network device itself outputs as will be stated later (step S2). Incidentally, the processing of the step S2 can be iteratively executed, for example, periodically. Upon judging that the route learning occurs frequently, the network device C 500 (for example, the device failure event transmission program 320) transmits a device failure event to the server 200 (step S301). The device failure event contains, for example, a pertinent function, an object to-be-monitored and failure information. Here, the pertinent function is the "routing", the object to-be-monitored is the "network device C 500", and the failure information is the "frequent occurrences of the route learning". Incidentally, these information items may well be predetermined identifiers. Subsequently, the server 200 receives the device failure event by, for example, the device failure event reception program 260, and it selects that one of the corresponding scenarios as to which the frequency information is the largest or at least a predetermined value, on the basis of information contained in the device failure event and by reference to the scenario candidate list 240 or the scenario table 230 (step S1). In the example of FIG. 6, a scenario 238 is selected. The frequency information indicates the number of times which the network device was recovered from the failure by reflecting or executing the corresponding countermeasure method in the past, and the scenario (countermeasure method) of which the failure recovery can be expected can be selected by selecting the scenario of large frequency information. Incidentally, the concrete processing of the steps S0, S1 and S2 will be described in detail later.

The server 200 (for example, the constitution definition template generation program 250) generates a constitution definition template in accordance with the countermeasure method contained in the selected scenario (step S302). Incidentally, when the scenario and frequency information of the scenario candidate list in FIG. 6 is referred to on the basis of the event from the network device C 500, as has been selected at the above step S1, the countermeasure method of the largest frequency information (the likeliest countermeasure method) is "cost+30 increase". The constitution definition template contains data, a command, etc. for reflecting the selected countermeasure method upon the network device. The server 200 transmits the constitution definition template to the constitution definition management program 310 of the network device C 500 (step S303). The constitution definition management program 310 of the network device C 500 receives the constitution definition template, and generates a constitution definition from the received constitution definition template so as to reflect the constitution definition (step S304). That is, the countermeasure method of the selected scenario is reflected. Incidentally, the server 200 may well transmit the countermeasure method to the network device C 500, which executes or reflects the countermeasure method. When the network device C 500 has recovered from the failure, the frequent occurrences of the route learning are not judged at the step S2 which is iteratively executed, and the device failure event is not transmitted again. However, if the network device C 500 does not recover from the failure, the device failure event is transmitted again (steps S2 and S301).

Subsequently, the server 200 judges if the device failure event from the network device C 500 which has transmitted the device failure event till then has stopped (step S305). By way of example, the stop of the device failure event is judged depending upon whether or not the device failure event of the same contents has been received from the network device C 500 within a fixed time period. In a case where the same device failure event has come from the network device C 500 (a case where the result of the step S305 is "no"), the server 200 regards the failure as not having been eliminated, and it repeats the processing of the steps S1 et seq. On the other hand, when the device failure event has stopped (in a case where the result of the step S305 is "yes"), the server 200 regards the failure as having been restrained, and it updates the frequency information of the corresponding scenario of the scenario table 230 by +1 (step S306). By the way, in a case where the corresponding scenario does not exist at the above step S1, or where all the scenarios have been selected by sequential selections, the server 200 may well directly notify the situation to the user (client). Incidentally, a plurality of countermeasure methods can also be combined as the countermeasure method of the scenario.

Figure 7:
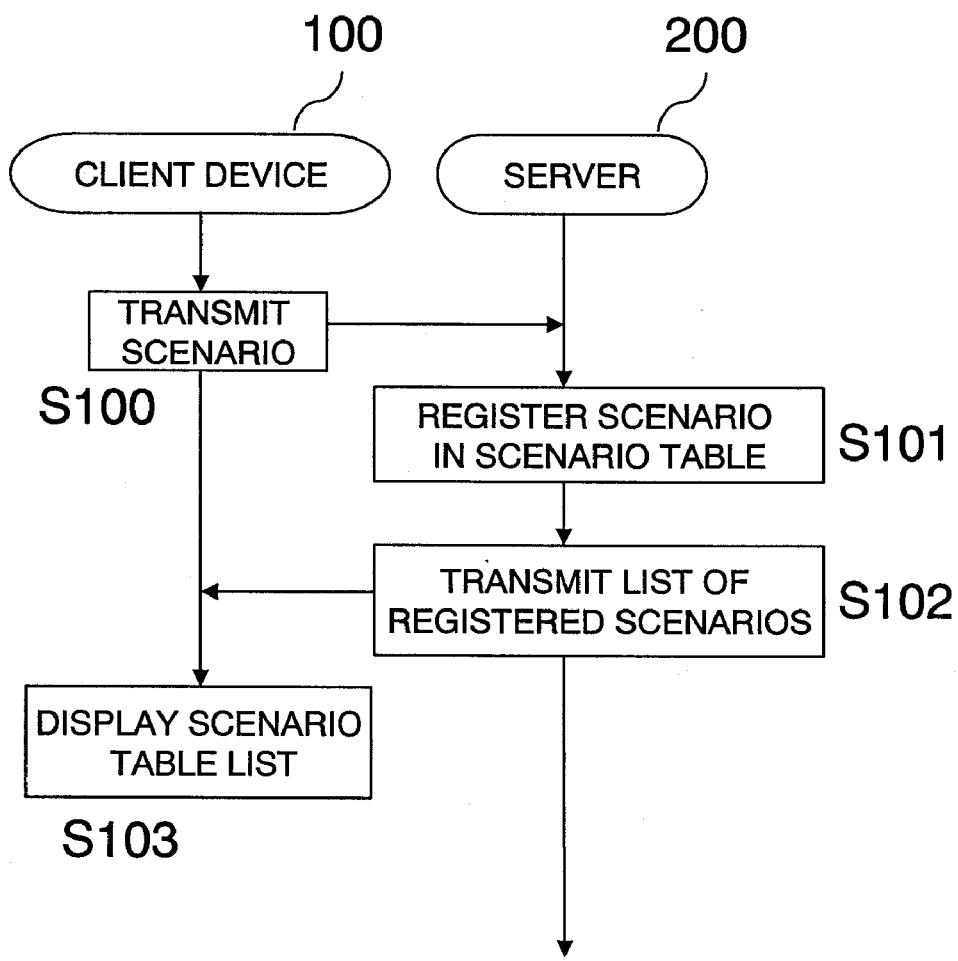
FIG. 7 is a flow chart in the case where the client registers a scenario.

FIG. 7 is the flow chart of the scenario registration (step S0).

First, the client 100 inputs a scenario which the user wants to register, from the input unit 150, so as to transmit the scenario to the server 200 (step S100). By way of example, the client 100 first displays the scenario input screen 121 on the display unit 120. Subsequently, the client 100 inputs the scenario which contains a pertinent function, an object to-be-monitored, failure information and a countermeasure method that are inputted by the user (administrator) in accordance with the display of the display unit 120, from the input unit 150. Here, as an example, the scenario 237 which contains the "routing" as the pertinent function, the "network device A or B" as the object to-be-monitored, the "frequent occurrences of route learning" as the failure information, and the "cost+10 increase" as the countermeasure method is inputted as exemplified in FIG. 4A. Further, the client 100 transmits the scenario 237 inputted by the user, to the server 200 when the button 101 for transmitting the scenario 237 is pushed.

The server 200 (for example, the scenario table management program 220) receives the scenario transmitted from the client 100 (step S100), and registers the scenario in the scenario table 230 (step S101). By way of example, the server 200 adds the received scenario 237 into the new entries of the scenario table 230. By way of example, the server 200 registers the "routing" in the pertinent function 231 of the scenario table 230, the "network device A or B" in the object to-be-monitored 232, the "frequent occurrences of route learning" in the failure information 233, and the "cost+10 increase" in the countermeasure method 234 in accordance with the received scenario 237. Besides, the server 200 initializes the corresponding frequency information (to, for example, "0").

The server 200 (for example, the scenario table display program 210) transmits to the client 100, a scenario list which contains the pertinent functions 231, objects to-be-monitored 232, failure information items 233, countermeasure methods 234 and frequency information items and which has been registered in the scenario table 230 (step S102). Incidentally, the server 200 may well transmit only the scenario and frequency information registered anew. The client 100 receives the registered scenario table list sent from the server 200, and displays the scenario list display screen 122 on the display unit 120 (step S103). By way of example, the client 100 displays on the display unit 120, the contents of the pertinent functions 231, objects to-be-monitored 232, failure information items 233, countermeasure methods 234 and frequency information items 235 which are contained in the scenario table list transmitted from the server 200.

Figure 8:
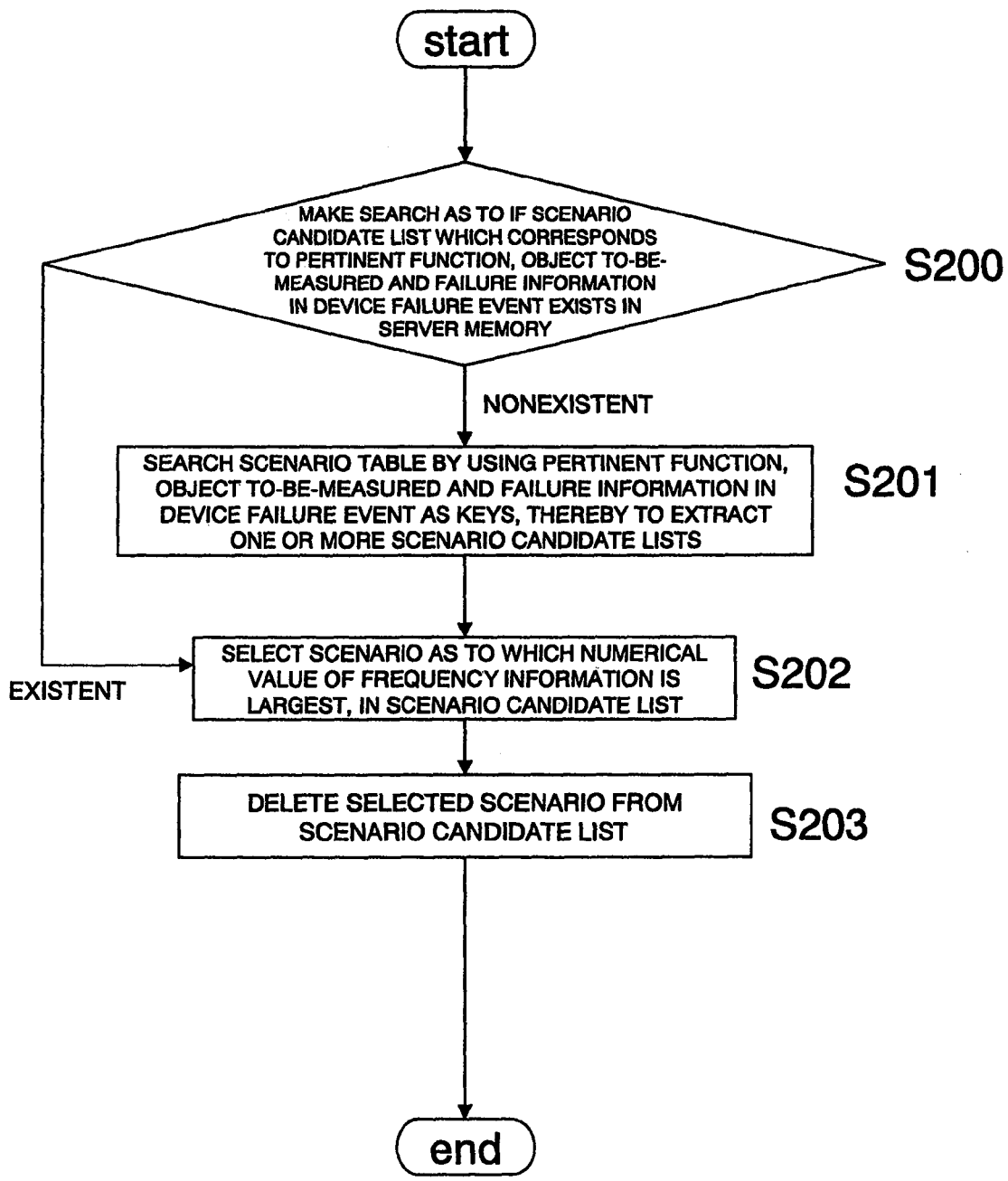
FIG. 8 is a flow chart of scenario selection.

FIG. 8 is the flow chart of the scenario selection (step S1) employing the scenario table.

First, the server 200 makes a search as to if a scenario candidate list 240 which corresponds to the pertinent function, object to-be-monitored and failure information existing in the device failure event from, for example, the network device C 500 exists in the memory 270 (step S200). In a case where the scenario candidate list 240 is nonexistent in the memory 270 (step S200), the server 200 (for example, the scenario table management program 220) searches the scenario table 230, by using the pertinent function, object to-be-monitored and failure information in the device failure event as keys, thereby to extract one or more scenario candidate lists 240 (step S201). Further, the server 200 stores the extracted scenario candidate list 240 in the memory 270. On the other hand, in a case where the scenario candidate list 240 which corresponds to the pertinent function, object to-be-monitored and failure information existing in the device failure event from the network device exists at the step S200 (step S200), the server 200 shifts to a step S202.

At the step S202, the server 200 selects the scenario as to which the numerical value of the frequency information is the largest, in the scenario candidate list 240 (step S202). Incidentally, the server 200 may well select an appropriate countermeasure method among the countermeasure methods as to which the frequency information items are, at least, a predetermined value. Besides, the server 200 may appropriately store the selected scenario or the countermeasure method in the scenario, in the memory 270. Subsequently, the server 200 deletes the scenario selected from the scenario candidate list 240, from the scenario candidate list 240 existing in the memory 270 (step S203). Thus, when a scenario is to be selected at the next timing, the scenario of the secondly largest frequency information is selected. Incidentally, the processing of the step S203 may well be omitted so as to select scenarios in the order of larger frequency information at the step S202.

Figure 10:
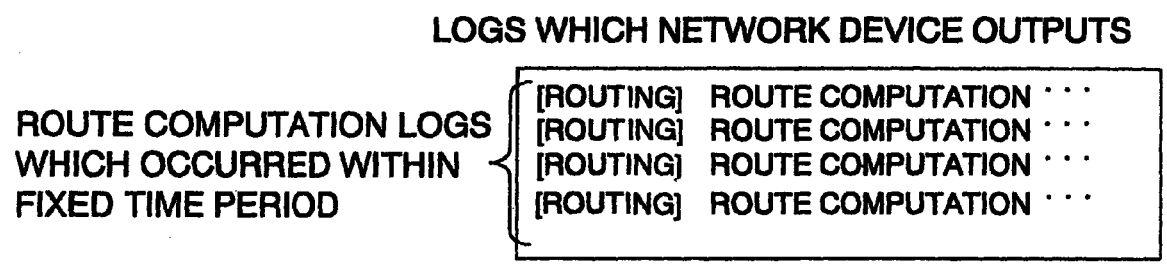
FIG. 10 is the list of logs which the network device outputs.

FIG. 10 is the list diagram of logs having occurred within a fixed time period as are outputted by the network device. The network device outputs the logs such as route computation logs having occurred within the fixed time period as shown in the figure. The logs may be either information on a database or information described in text.

Figure 11:
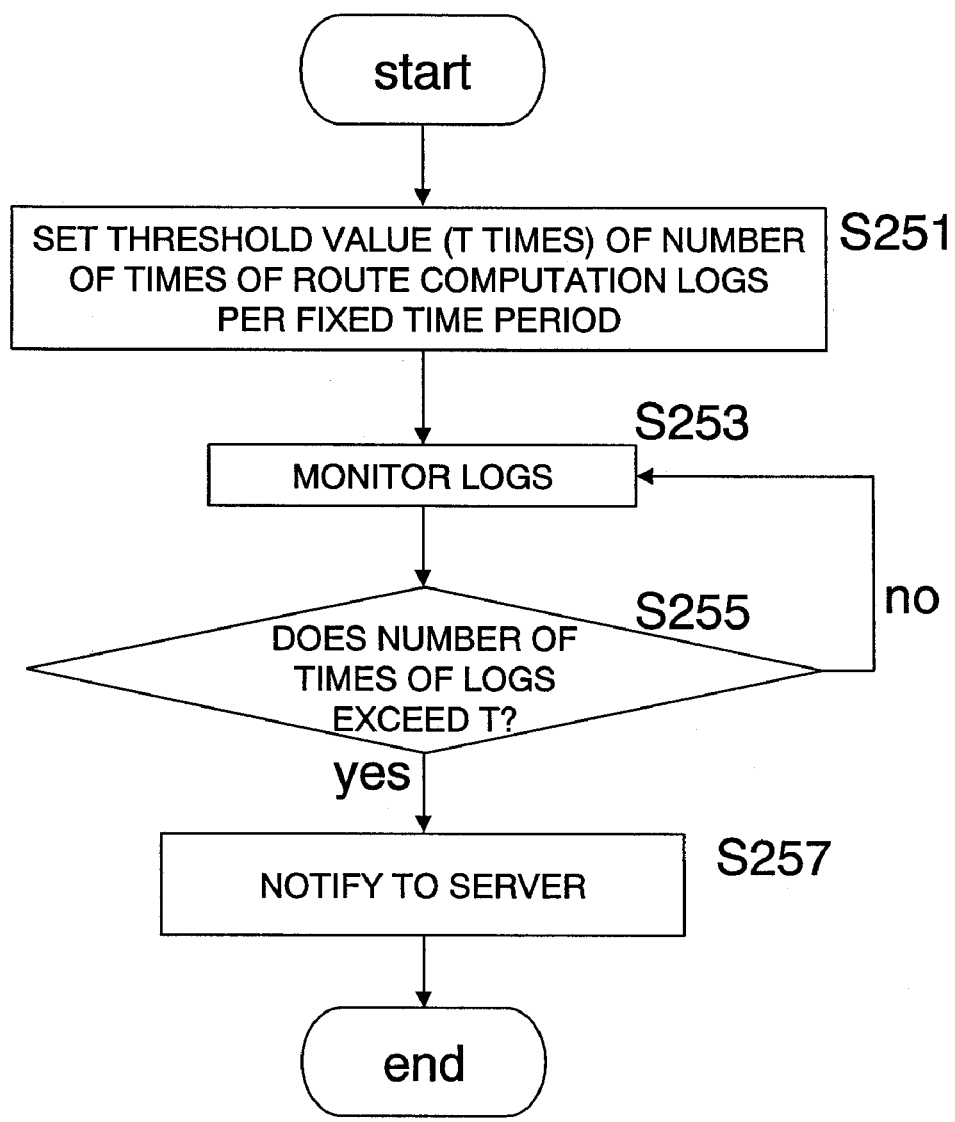
FIG. 11 is a flow chart in the case where the frequent occurrences of route learning are judged.

FIG. 11 is a flow chart in the case where the frequent occurrences of route learning are judged (step S2).

First, the network device C 500 which is using the routing function sets the threshold value (T times) of the number of times of route computation logs which occur within a fixed time period (step S251). Subsequently, the network device C 500 monitors logs outputted beforehand, and it calculates the number of times of the route computation logs having occurred within the fixed time period (step S253). The network device C 500 judges whether or not the calculated number of times of the route computation logs exceeds the threshold value (T) set at the step S251 (step S255). In a case where the set threshold value (T) is not exceeded ("no" at the step S255), the network device C 500 judges that the route learning does not occur frequently, and it continues the monitoring of the logs (step S253). On the other hand, in a case where the number of times of the route computation logs exceeds the threshold value set at the step S251 ("yes" at the step S255), the network device C 500 judges that the route learning occurs frequently, and it transmits the device failure event to the server (step S257). Here, the device failure event contains, for example, the "routing" as the pertinent function, the identification information of the device itself (for example, the "network device C") as the object to-be-monitored, and the "frequent occurrences of route learning" as the failure information. Incidentally, although the network device C 500 has been described in the above, the same holds true of the network device A 300 or the network device B 400.

2. Second Embodiment

In this embodiment, an embodiment in layer-2 device redundancy will be described.

Figure 12:
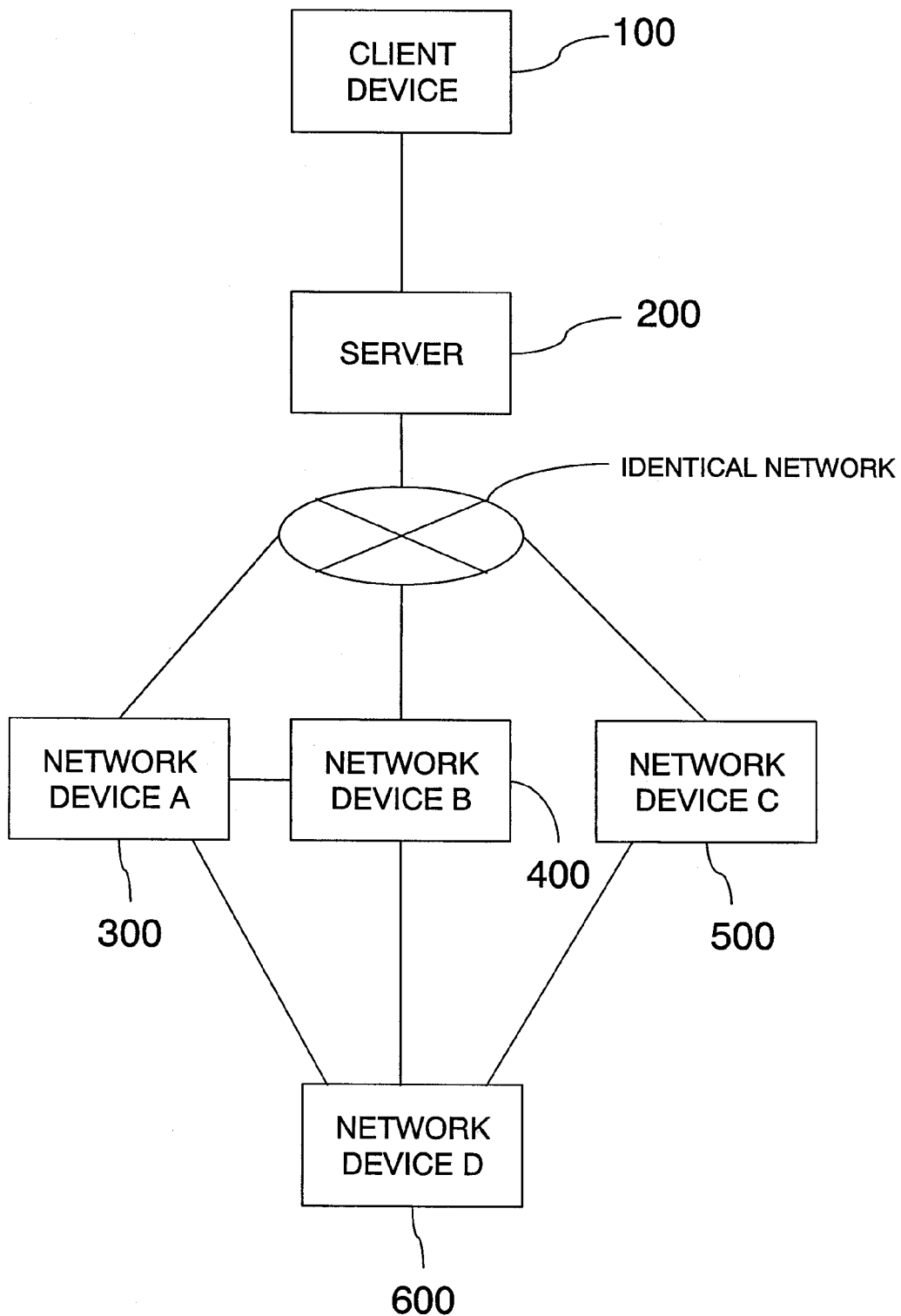
FIG. 12 is a diagram showing the general configuration according to the second embodiment in the case of an L2 redundant configuration.

FIG. 12 is a general configurational diagram in the case of employing the function of the L2 redundancy. One of differences from the first embodiment is the point that events are received from two network devices, and that the two network devices are prompted to alter functions. Also, it is different from the first embodiment that one item of failure information is specified on the basis of the respective events from the two network devices. However, although the two network devices are handled in this example, it is not especially restricted to handle one or more network devices, in accordance with functions which are employed in the network devices.

An automatic failure recovery system includes a client device 100, a server 200, and the network devices. By way of example, the plurality of network devices can be included. In the illustrated example, a network device A 300, a network device B 400, a network device C 500 and a network device D 600 are included. In FIG. 12, the network devices A 300 and B 400 have the function of, for example, L2 redundant switching. Since the configuration of each of the devices is the same as in the first embodiment, it shall be omitted from description.

FIG. 13 shows a scenario candidate list which is extracted from the scenario table 230, and in which some of scenarios supposed in the configuration of FIG. 12 are registered. In the illustrated example, the scenarios concerning the L2 redundancy are extracted.

FIGS. 15A-15C show the configurational diagram of a status alteration decision table which the server 200 retains. The status alteration decision table holds network device statuses indicating whether the individual devices are masters or backups, for the respective network devices. By way of example, device failure events from the network devices A 300 and B 400 are received, and the two network device statuses of the master and the backup are held.

Figure 14:
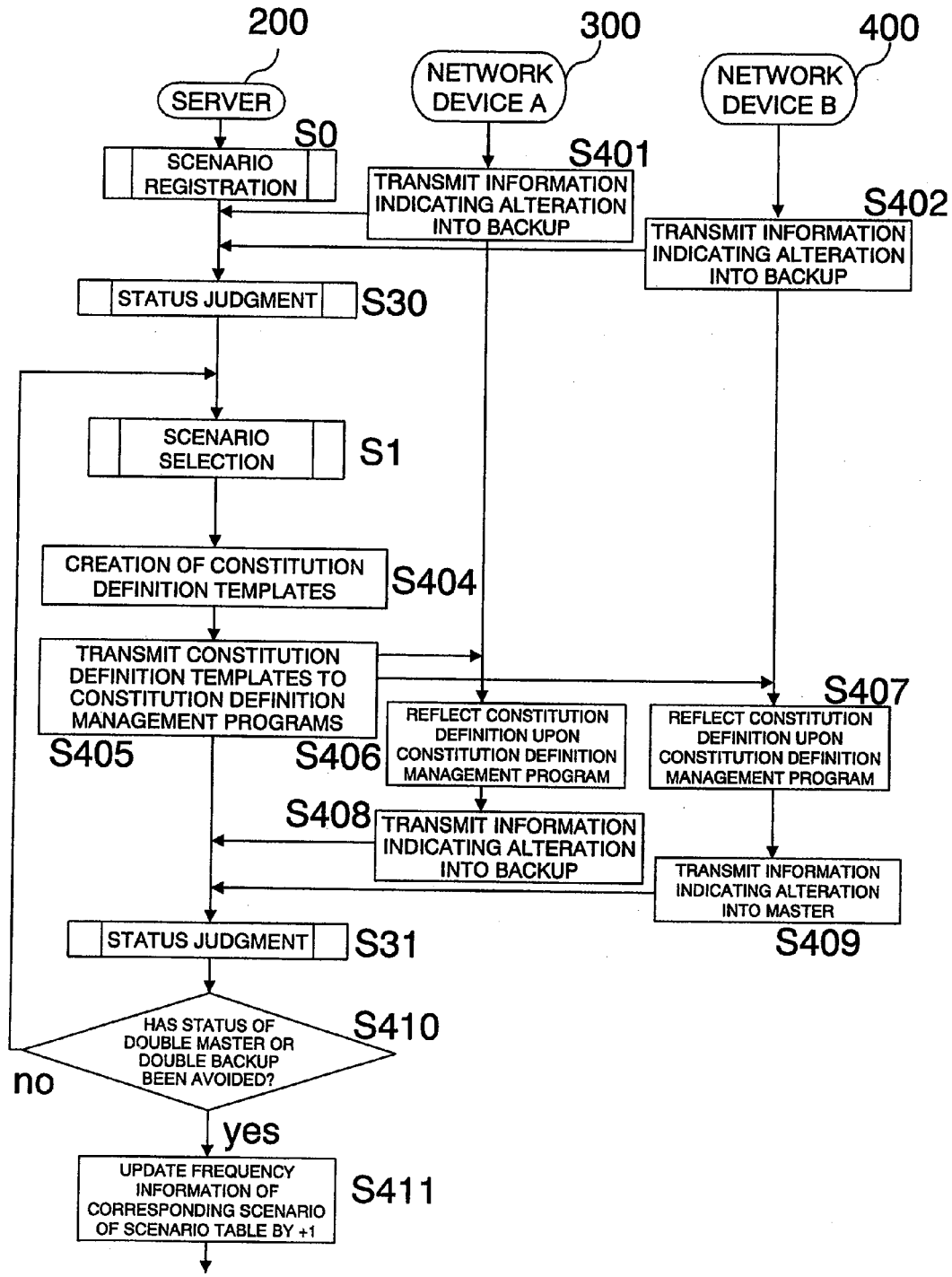
FIG. 14 is a system flow chart in the case of using an L2 redundant function.

FIG. 14 is a flow chart in the case where this embodiment is applied in the L2 redundant function. Here will be described a case where both the network devices A 300 and B 400 have their statuses shifted from the masters into the backups.

First, the server 200 registers scenarios beforehand in the same manner as in the first embodiment (step S0). The network devices A 300 and B 400 transmit the device failure events that their statuses have changed from the masters into the backups, respectively. Here, the device failure event contains the pertinent function (for example, the L2 redundancy), the object to-be-monitored (for example, the network device A 300 or B 400), and alteration information (for example, the backup or the master). The server 200 having received the two device failure events updates the status alteration decision table in FIGS. 15A-15C in accordance with the alteration information (FIG. 15B), and judges the statuses of double backup on the basis of the altered status alteration decision table (step S30). By way of example, the failure information is set at the "double backup" on the basis of the statuses of the network devices A 300 and B 400. The details of the processing of the status judgment (step S30) will be explained later. It is different from the first embodiment that one item of failure information is formed by the two events.

Subsequently, a scenario is selected in accordance with the scenario candidate list exemplified in FIG. 13, in the same manner as in the first embodiment (step S1). Here, the pertinent function is the L2 redundancy, the object to-be-monitored is the network devices A 300 and B 400, and the failure information is the double backup, so that the scenario 239 of the largest frequency information is selected among corresponding scenarios. The server 200 creates constitution definition templates (step S404). In this embodiment, the object consists of the two network devices, and hence, the two sorts of constitution definition templates are generated. By way of example, in accordance with the countermeasure method of the selected scenario 239, the constitution definition template destined for the network device A 300 contains the "backup" as a countermeasure, whereas the constitution definition template destined for the network device B 400 contains the "master" as a countermeasure. The server 200 transmits the constitution definition templates to the constitution definition management programs of the respective network devices A 300 and B 400 (step S405).

The network devices A 300 and B400 receive the templates, and reflect constitution definitions upon the constitution definition management programs (steps S406 and S407). Subsequently, the network device A 300 transmits the device failure event that the status has been altered into the backup (step S408). Likewise, the network device B 400 transmits the device failure event that the status has been altered into the master (step S409). Upon receiving the events, the server 200 judges statuses similarly to the above (step S31). Thus, the server 200 judges if the status of the double backup or the double master has been avoided in the L2 redundant configuration consisting of the network devices A 300 and B 400 (step S410). When the status has been avoided ("yes" at the step S410), the server 200 updates the frequency information of the corresponding scenario of the scenario table 230 by +1 (step S411). On the other hand, in a case where the failure recovery has failed of success and where the failure has been judged as not being avoided at the step S410 ("no" at the step S410), the routine is repeated from the step S1 in the same manner as in the first embodiment.

Figure 16:
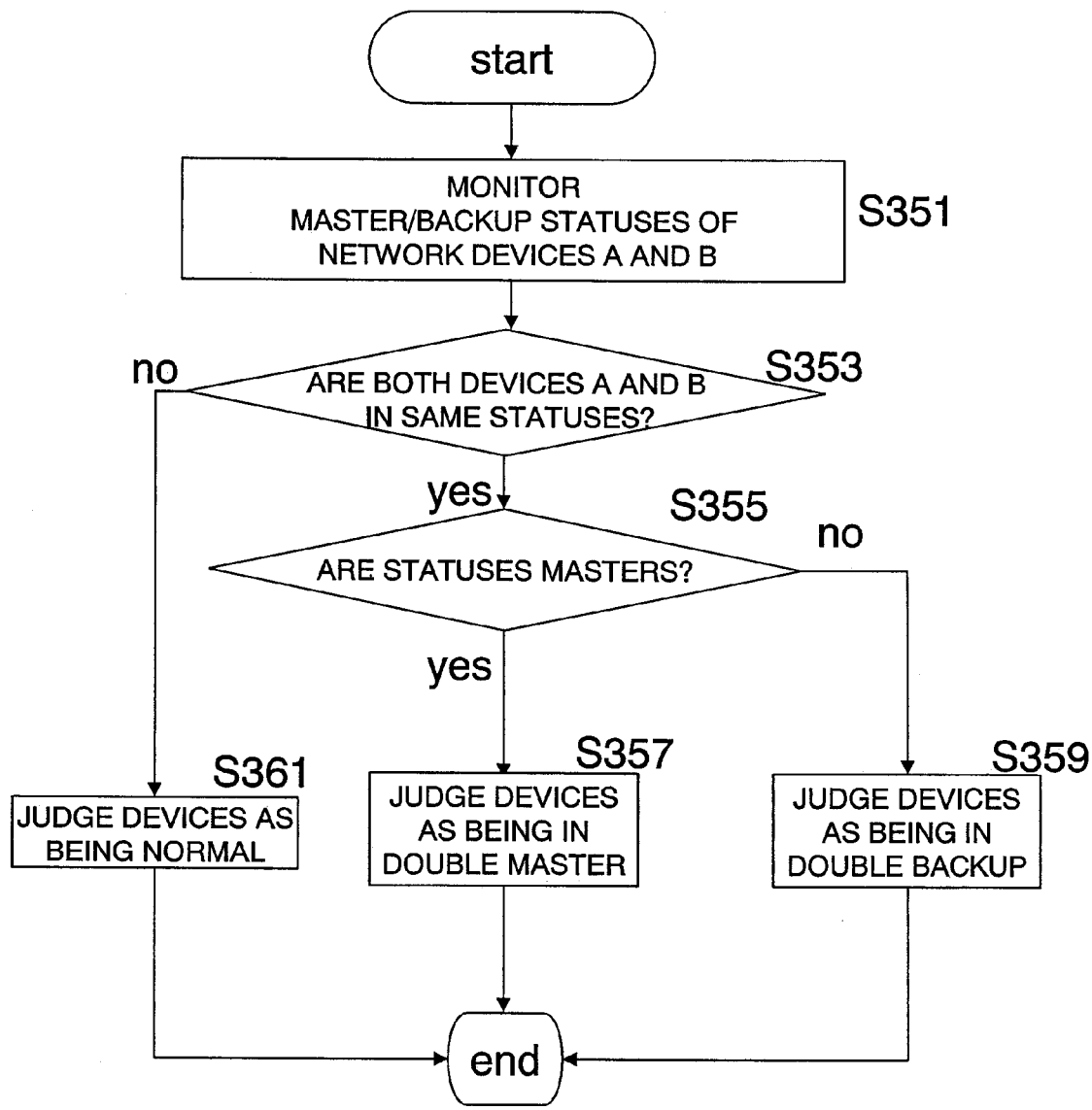
FIG. 16 is a flow chart of a status judgment.

FIG. 16 is the flowchart of the master/backup status judgment (step S30 or S31).

The server 200 monitors the master/backup statuses of the network devices A and B (step S351). Subsequently, the server 200 judges if both the network devices A and B are in the same statuses (step S353). If the network devices A and B are not in the same statuses (S353: "no"), the server 200 judges the devices A and B as being normal (step S361) and ends the processing of the status judgment. On the other hand, if the network devices A and B are in the same statuses (S353: "yes"), the server 200 judges if the statuses are masters (step S355). If the statuses are the masters (S355: "yes"), the server 200 sets the failure information at the "double master" (step S357). On the other hand, if the statuses are backups (S355: "no"), the server 200 sets the failure information at the "double backup" (step S359).

3. Third Embodiment

In this embodiment, an embodiment in multicast routing will be described.

Figure 17:
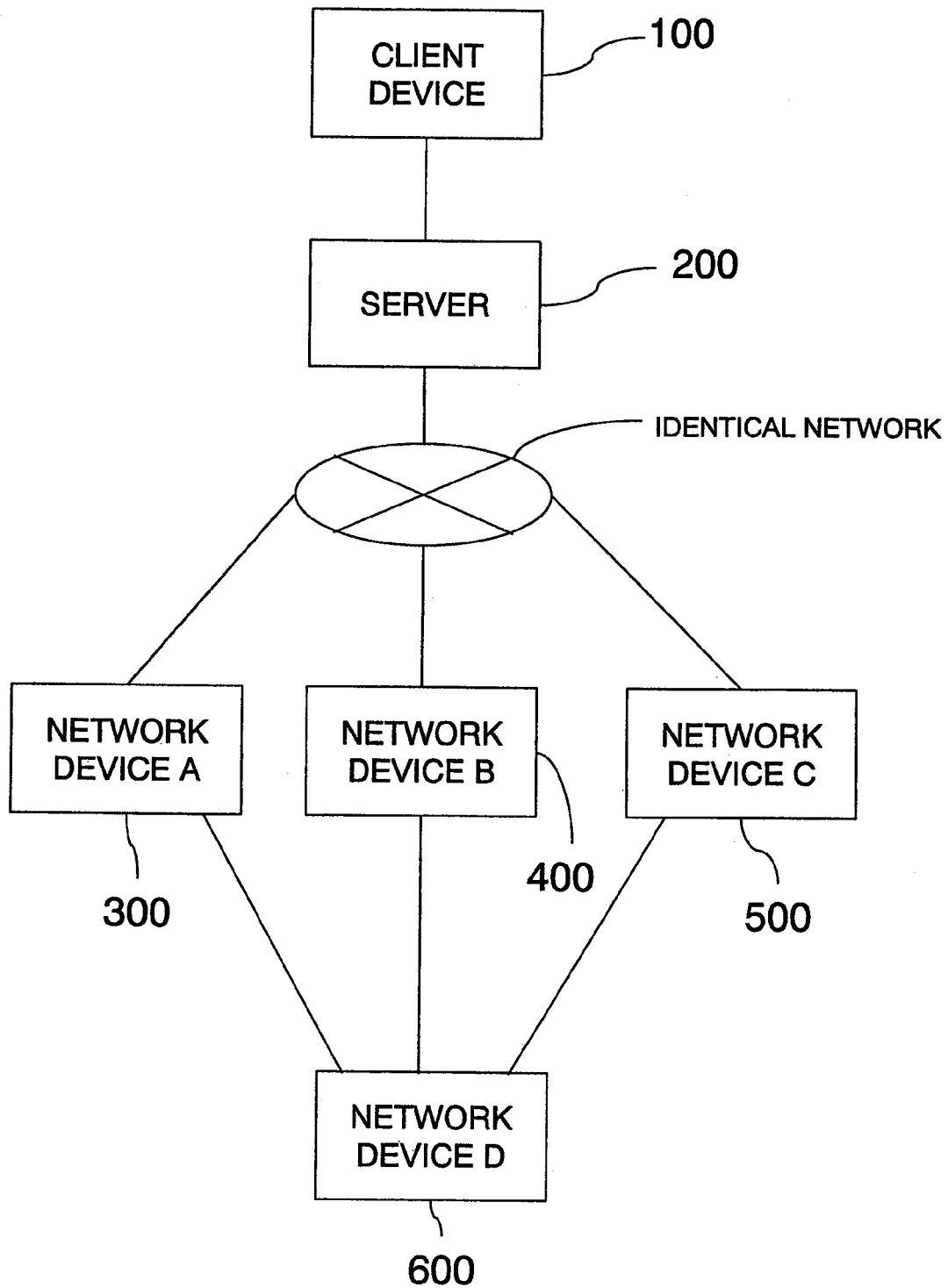
FIG. 17 is a diagram showing a general configuration in the case of using a multicast routing function.

FIG. 17 is a general configurational diagram in the case of employing the function of the multicast routing. One of differences from the first embodiment is that a network device which transmits an event and a network device upon which a constitution definition is reflected are different. Although four network devices are handled in this example, it is not especially restricted to handle one or more network devices, in accordance with functions which are employed in the network devices.

An automatic failure recovery system includes a client device 100, a server 200, and the network devices. By way of example, the plurality of network devices can be included. In the illustrated example, a network device A 300, a network device B 400, a network device C 500 and a network device D 600 are included. In FIG. 17, the network devices A 300, B 400 and C 500 have the function of the RP's of the multicast routing. Incidentally, since the remaining configuration is the same as in the first embodiment, it shall be omitted from description.

Any of the network devices A 300, B 400 and C 500 is set as being capable of becoming the network device in which the RP is set, as viewed from the network device D 600. The "RP" is short for "Rendezvous Point" in the multicast routing.

FIG. 18 shows a scenario candidate list 240 which is extracted from a scenario table 230, and in which some of scenarios supposed in the configuration of FIG. 17 are registered.

Figure 19:
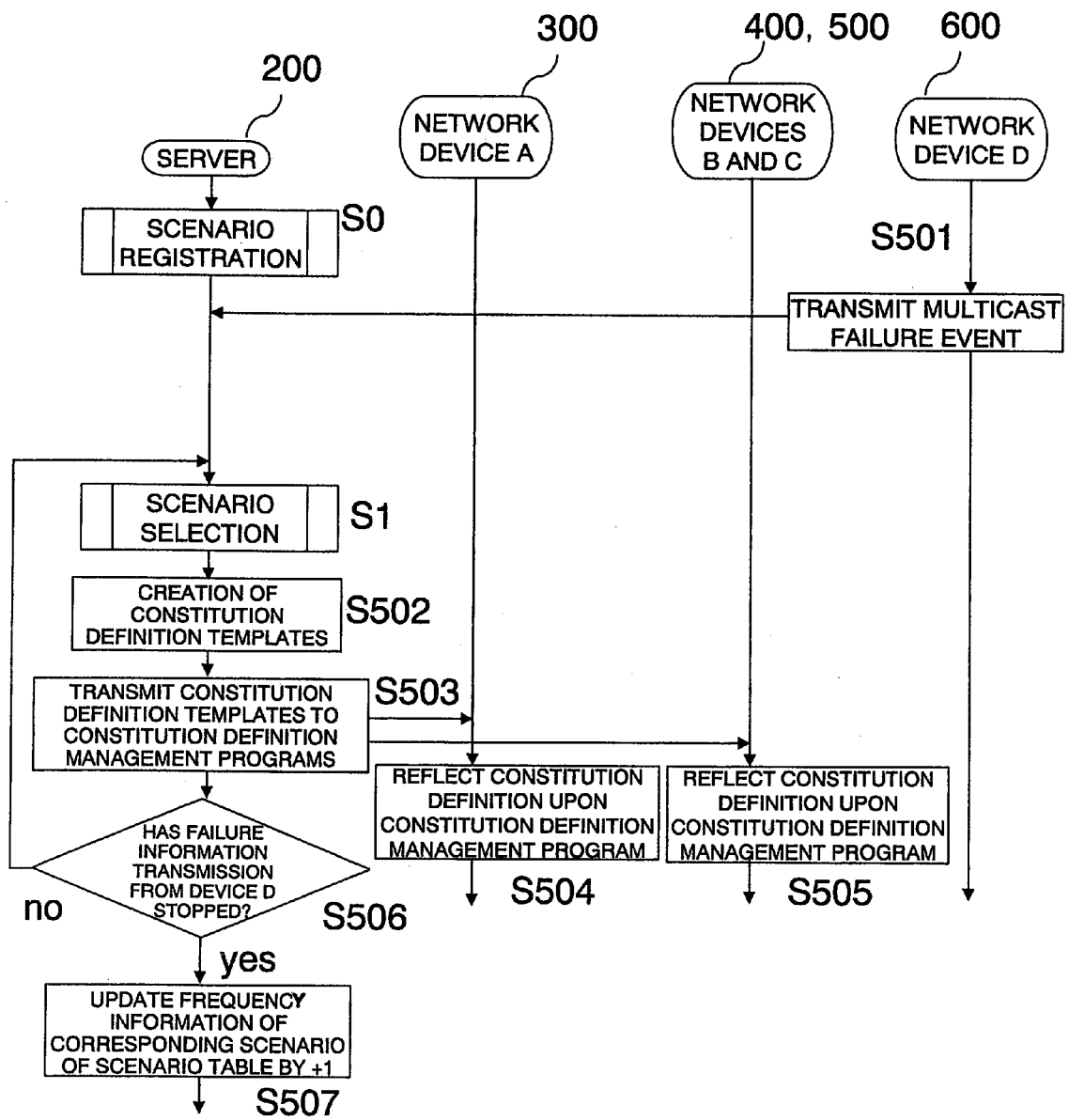
FIG. 19 is a system flow chart in the case of using the multicast routing function.

FIG. 19 is the flowchart of this embodiment in the multicast routing function. There will be described a status where the RP has been set in the network device A 300, but where the network device A 300 has failed to function as the RP, for any cause.

The server 200 registers scenarios beforehand in the same manner as in the first embodiment (step S0). The network device D 600 transmits the device failure event that, since the RP has failed to be seen, the multicast routing cannot be performed. The device failure event here contains, for example, the pertinent function (for example, the multicast routing), the object to-be-monitored (for example, the network device D), and the failure information (for example, that the RP has failed to be seen). Subsequently, the server 200 selects a scenario in accordance with the scenario candidate list 240 in FIG. 18, in the same manner as in the first embodiment (step S1). Here, the scenario 241 of the largest frequency information is selected among corresponding scenarios. The server 200 creates constitution definition templates (step S502). In this embodiment, the object consists of the three network devices, and hence, the three sorts of constitution definition templates are generated. By way of example, in accordance with the countermeasure method of the selected scenario 241, the constitution definition template destined for the network device A 300 contains "RP setting: no" as the countermeasure method, the constitution definition template destined for the network device B 400 contains "RP setting: yes" as the countermeasure method, and the constitution definition template destined for the network device C 500 contains "RP setting: no" as the countermeasure method. The server 200 transmits the constitution definition templates to the constitution definition management programs of the respective network devices A 300, B 400 and C 500 (step S503).

Subsequently, the network device A 300 alters the setting of the RP into "no" in accordance with the received constitution definition template (step S504). Likewise, the network devices B 400 and C 500 alter the settings of the RP's into "yes" and "no" in accordance with the received constitution definition templates, respectively (step S505). Subsequently, the server 200 judges if the transmission of the same device failure event has stopped within a fixed time period from the network device D 600 which was transmitting the device failure event before (step S506). In a case where the device failure event has come within the fixed time period ("no" at the step S506), the server 200 regards the network device D 600 as not having recovered from the failure, and it repeats the steps S1 et seq. again. On the other hand, in a case where the device failure event is not received within the fixed time period ("yes" at the step S506), the server 200 regards the device failure event as having stopped and the failure as having been restrained, and it updates the frequency information of the corresponding scenario of the scenario table 230 by +1 (step S507).

Incidentally, while the first, second and third embodiments have been separately described, the server in each of the embodiments can be incarnated by one or more servers.

According to the first-third embodiments described above, the following advantages are achieved by way of example:

(1) According to any of the embodiments, countermeasure methods against failures predicted beforehand are performed in the order of frequency, whereby the restraint of the failure in a network or the automatic recovery of the network from the failure can be attained. Besides, according to any of the embodiments, frequency information is affixed to the performed countermeasure method which has succeeded in the restraint of or automatic recovery from the failure in the network, whereby the possibility of the selection of the reliable countermeasure method based on the frequency information increases, and the stabilization of a more efficient network can be attained. Further, according to any of the embodiments, the countermeasure methods of hierarchized network layers are registered beforehand, whereby even the failure of the specified network layer having hitherto been difficult of solution can be coped with.

(2) According to any of the embodiments, a constitution definition template can be described in a peculiar format, and this can facilitate the creation of a constitution definition template creation application.

(3) According to any of the embodiments, the formats of the grammar definition and constitution definition of the constitution definition template have predetermined conversion rules therebetween, and this can facilitate the conversion of the grammar definition into the constitution definition which is a machine type-dependent definition. In the constitution definition template and the constitution definition of any of the embodiments, it is one of features that the formats of the grammar definition and constitution definition of the constitution definition template have the predetermined conversion rules therebetween.

(4) According to any of the embodiments, a client which is an external interface for registering scenarios in the scenario table of a server or for displaying a scenario table list has it as one of features that the client is connected with the server through the communications between processes which incarnate a function in the network or the server. Therefore, the connection of the client with an existing system or a distributed system environment is facilitated.

(5) According to any of the embodiments, the function of transmitting a device failure event which is the information of a failure ascribable to a network-relayed function reflected by the constitution definition, or the status change of a function, has it as one of features to contain a communicational transmission function which is included in a network device, or a transmission function which is based on call-back from the server or the network device. Therefore, a transmission technique which is employed in association with an existing system or a distributed system is easily coped with.

(6) According to any of the embodiments, an object to-be-monitored has it as one of features that one or more network devices or a functional part in the network device can be logically described. Therefore, the description of the scenarios of one or more network devices is facilitated, and the scenario table is easily made appropriate.

(7) According to any of the embodiments, all the countermeasure methods corresponding to the failure as have been registered in the scenario table by a user are successively executed in the order of the frequency information. In a case where the reception of the device failure event continues in spite of the nonexistence of any unselected scenario, a request for a manual countermeasure is notified to the user, and hence, even any unknown failure can be coped with.

(8) According to any of the embodiments, relevant scenario candidates are extracted as a scenario candidate list, so that an efficiency for selecting the corresponding scenario is favorable.

(9) According to any of the embodiments, the priority degrees of the frequency information are definitely determined, so that the countermeasure methods can be executed in the order in which they were oftener used in the system in the past.

(10) According to any of the embodiments, the efficiency of the selection of a pertinent process to be selected can be enhanced on the basis of the frequency of the uses of respective pertinent processes.

(11) According to any of the embodiments, the frequency of the uses of the countermeasure methods against similar failures in the past is affixed as the frequency information, to the combinations of failure sorts and the countermeasure methods as have been registered as the scenarios beforehand by the user, whereby the selection of the pertinent method based on a past example can be performed by a computer.

(12) According to any of the embodiments, the scenarios can be easily registered in the scenario table.

(13) According to any of the embodiments, the function of displaying the scenario table list is directly directed toward a man being the user or is directed toward a program, so that a GUI (Graphic User Interface) or application building is possible.

(14) According to any of the embodiments, the data structure of the scenario table is made definite, so that the installation of the scenario table as an application is easy.

(15) According to any of the embodiments, the constitution definition template is employed as the description of the countermeasure methods, so that logical description is possible.

(16) According to any of the embodiments, regarding the scenario table, in a case where the frequency information items of the scenarios registered in the scenario table are "0's", a sequence in which the scenarios are registered in the table becomes an order for selecting the scenarios. Therefore, an operation can be appropriately performed even in a status where the frequency information is not updated after the registration of the scenarios.

(17) According to any of the embodiments, regarding the scenario table, in a case where the frequency information items of two or more scenarios registered in the scenario table have the same values, the sequence in which the scenarios are registered in the table becomes the order for selecting the scenarios. Therefore, processing can be appropriately executed even when the frequency information items have the same values.

(18) According to any of the embodiments, some of the scenarios can make the network unstable when executed a plurality of times. Therefore, a certain limitation can be imposed in such a way that the user sets the limitation at will, or that the limitation as the system is set beforehand.

(19) According to any of the embodiments, some of the scenarios can make the network unstable when executed for a long time. Therefore, a certain limitation can be imposed on the execution of the scenario by setting the certain limitation for a time period for which the server continues to accept any specified device failure event.

(20) According to any of the embodiments, logs are held, whereby the selection or execution order of the scenarios executed by the system or the status changes of the network devices based on the scenario executions can be traced, and they can serve for the creations of the scenarios or the radical solutions of the failures.

(21) According to any of the embodiments, items constituting the scenarios of the scenario table are made extensible, whereby the weighting of the scenario selections can be distinguished in the future.

4. Fourth Embodiment

Examples to be indicated below can be combined with one another without changing the essentials thereof, and they can be applied to the other embodiments.

FIG. 21 is such that manual data 2000 are added to the items of the scenario table 230 shown in FIG. 5, as extension information. The manual data 2000 may be directly stored in the table in an XML (Extensible Markup Language), or may well have reference pointers to an external database. A user adds the manual data 2000 as the supplemental information of the failure information or as notabilia. The addition is applicable to any of the scenario tables in the first to third embodiments.

FIG. 22 shows a relation in which a maintenance manual 800 is generated from information items (constituents) contained in the scenario table 230 shown in FIG. 21, by combinations. Although the constituents of the maintenance manual 800 are set as the pertinent function 231, the failure information 233 and the manual data 2000 in FIG. 22, any constituents of the scenario table 230 may be adopted within a range which the user requires. Besides, external information items can be combined. However, in the case where the constituents of the scenario table 230 are combined with the external information items, reference pointers are described as URI's (Uniform Resource Identifiers) on the manual data, or the items of the scenario table 230 are extended so as to utilize URI's similar to those of the manual data.

FIG. 23 shows a concrete example of contents stored in the manual data 2000 being the constituent in FIG. 21, and the example is manual data 700 (manual data relevant to route learning) described in the XML. The format of the XML tag of the manual data 700 can be defined by the user.

FIG. 24 shows the maintenance manual 800 generated by combining the manual data and the items of the scenario table. When the maintenance manual 800 is generated in the XML, it becomes convertible into, for example, an HTML (Hyper Text Markup Language) or Word document, and the maintenance manual conforming to the environment of the user can be provided.

According to the fourth embodiment described above, the following advantages are achieved by way of example:

(1) In addition to automatic recovery from a failure, the alteration point of a supplement, a note or the like can be notified to a user in more detail.

(2) When a maintenance manual is held in an XML format, it is possible to exploit the property that the maintenance manual can be easily converted into any document which the XML has. The maintenance manual has its reusability enhanced unlike, for example, one printed on paper or one created in an HTML format from the beginning.

According to this embodiment, it is possible to provide a failure recovery system and a server in which priority degrees conforming to the actual operation of a network are automatically learnt as frequency information, whereby a scenario containing a countermeasure method and registered beforehand is selected, and the network is automatically recovered from a failure. Besides, according to the invention, it is possible to provide a failure recovery system, etc. in a network control as can decrease the cost of the network operation.

In an environment wherein a large number of complicated network control protocols are used as in the present-day network, the network needs to be always tuned. In actuality, however, the tuning is often fine parameter adjustments and is often a succession of simple operations. In this regard, it is permitted to decrease human and temporal costs by this embodiment. Besides, unlike the radical solution of a network failure, every possible means is tried, whereby a time period until an operator actually deals with the failure can be gained. Further, according to the invention, supposed countermeasures are automatically executed before the operator deals with the failure, and the operator can more effectively deal with the failure.

The invention claimed is:

1. A failure recovery system comprising:
   one or more network devices constituting a network; and
   a server connected to said network devices, and including a memory storing a scenario table in which object to-be-monitored information that indicates said network device or devices being objects for failure recovery, failure information for identifying contents of failures, and countermeasure information against the failures, and frequency information that indicates the number of times of recoveries from the failures based on the countermeasure information are correspondingly stored;
   wherein:
   said network device detects the failure of said network device itself, and transmits to said server, a failure event which contains the object to-be-monitored information indicating said device itself, and the failure information for identifying content of the failure;
   said server receives the failure event, searches for one or more countermeasure information items corresponding to the object to-be-monitored information and the failure information which are contained in the failure event, by reference to the scenario table, and selects from among the pertinent countermeasure information items, one countermeasure information item as to which the corresponding frequency information is the largest, or, is equal to or larger than a predetermined value;
   said server transmits the selected countermeasure information item to said network device;
   said network device receives the countermeasure information item, and reflects the countermeasure information item or alters its setting on the basis of the countermeasure information item; and
   when said server judges that the failure event is not received again within a predetermined time period since the transmission of the selected countermeasure information item, said server increases the frequency information item corresponding to the selected countermeasure information item, by reference to the scenario table,
   further wherein the transmission to said server includes that:
   said network device monitors logs output beforehand and containing logs of route computations, so as to evaluate the number of times route computations have occurred within a fixed time period,
   said network device detects the failure of frequent occurrences of route learning, because an evaluated number of times of the route computations is larger than a preset threshold value, and
   said network device transmits to said server, the failure event which contains the object to-be-monitored information indicating the device itself, and the failure information for identifying the frequent occurrences of the route learning.

2. A failure recovery system comprising:
   a first network device constituting a network;
   a second network device connected to said first network device, and constituting the network; and
   a server connected to said first and second network devices, and including a memory storing a scenario table in which object to-be-monitored information that indicates said first and second network devices being objects for recovery from a failure, failure information that is determined by a combination of a status of said first network device and a status of said second network device, countermeasure information against the failure, and frequency information that indicates the number of times of the recoveries from the failure based on the countermeasure information are correspondingly stored;
   wherein:
   said first network device transmits to said server, a first event which contains first object to-be-monitored information indicating said device itself, and first status information indicating the status of said device itself;
   said second network device transmits to said server, a second event which contains second object to-be-monitored information indicating said device itself, and second status information indicating the status of said device itself;
   said server receives the first and second events, judges existence or nonexistence of the failure on the basis of the first status information and the second status information, and finds failure information;
   said server searches for one or more countermeasure information items which correspond to the first and second object to-be-monitored information items respectively contained in the first and second events, and the found failure information, by reference to the scenario table, and selects from among the pertinent countermeasure information items, one countermeasure information item as to which the corresponding frequency information is the largest, or, is equal to or larger than a predetermined value;

said server transmits the selected countermeasure information item to said first and second network devices, respectively;

said first and second network devices receive the countermeasure information item, and reflect said countermeasure information item or alter their settings on the basis of the countermeasure information item, respectively; and when the failure is avoided, said server increases the frequency information item corresponding to the selected countermeasure information item, by reference to the scenario table, further wherein:

said first and second network devices operate in a redundant configuration;

the finding of the failure information contains that, in a case where both the first status information of said first network device and the second status information of said second network device indicate masters, or where both of them indicate backups, said server judges the existence of the failure, and that said server finds the failure information indicating "double master" or "double backup"; and the countermeasure information contains information for bringing one of said first network device and said second network device into the master, and the other into the backup.

3. A failure recovery system comprising:

a first network device constituting a network;

a second network device constituting the network;

a third network device connected to the network through said first network device, and connected to the network through said second network device; and a server connected to said first and second network devices, and including a scenario table in which object to-be-monitored information that indicates the network device or devices being objects for failure recovery, failure information for identifying contents of failures, countermeasure information against the failures, and frequency information that indicates the number of times of recoveries from the failures based on the countermeasure information are correspondingly stored;

wherein:

when said third network device detects that a failure has occurred in a transfer to the network, due to the failure of said first or second network device, said third network device transmits to said server, a failure event which contains the object to-be-monitored information indicating said device itself, and failure information for identifying the failure of a transfer function;

said server receives the failure event, searches for one or more countermeasure information items corresponding to the object to-be-monitored information and the failure information which are contained in the failure event, by reference to the scenario table, and selects from among the pertinent countermeasure information items, one countermeasure information item as to which the corresponding frequency information is the largest, or, is equal to or larger than a predetermined value;

said server transmits the countermeasure information item to said first and second network devices in conformity with the selected countermeasure information item;

said first and second network devices receive the countermeasure information item, and reflect the countermeasure information item or alter their settings on the basis of the countermeasure information item; and when said server does not receive the failure event again within a predetermined time period since the transmission of the selected countermeasure information item, said server increases the frequency information corresponding to the selected countermeasure information item, by reference to the scenario table, further wherein:

the first network device is set as a rendezvous point of multicast routing;

the transmission to said server includes that said third network device detects occurrence of a failure in a multicast routing function of said device itself, due to a failure of a rendezvous point function of said first network device, and transmits the failure event to said server; and the countermeasure information item contains information for setting the second network device as a rendezvous point of the multicast routing.

4. A failure recovery system as defined comprising:

one or more network devices constituting a network;

a server connected to said network devices, and storing a scenario table in which object to-be-monitored information that indicates said network device or devices being objects for failure recovery, failure information for identifying contents of failures, and a plurality of countermeasure information items against each of the failures, and frequency information that indicates the number of times of recoveries from the failures based on the countermeasure information are correspondingly stored; and a client device which is connected to said server;

wherein:

said network device detects the failure of said network device itself, and transmits to said server, a failure event which contains the object to-be-monitored information indicating said device itself, and the failure information for identifying content of the failure;

said server receives the failure event, searches for one or more countermeasure information items corresponding to the object to-be-monitored information and the failure information which are contained in the failure event, by reference to the scenario table, and selects from among the pertinent countermeasure information items, one countermeasure information item as to which the corresponding frequency information is the largest, or, is equal to or larger than a predetermined value;

said server transmits the selected countermeasure information item to said network device;

said network device receives the countermeasure information item, and reflects the countermeasure information item or alters its setting on the basis of the countermeasure information item;

when said server judges that the failure event is not received again within a predetermined time period since the transmission of the selected countermeasure information item, said server increases the frequency information item corresponding to the selected countermeasure information item, by reference to the scenario table;

said server notifies to said client device in a case where an unselected countermeasure information item has become nonexistent by repeatedly selecting pertinent countermeasure information items in the scenario table; and said client device displays on a display unit or outputs to an output unit, nonexistence of the countermeasure information.

5. A failure recovery system comprising:

a first network device constituting a network;

a second network device connected to said first network device, and constituting the network;

a server connected to said first and second network devices and storing a scenario table in which object to-be-monitored information that indicates said first and second network devices being objects for recovery from a failure, failure information that is determined by a combination of a status of said first network device and a status of said second network device, a plurality of countermeasure information items against each of the failures, and frequency information that indicates the number of times of the recoveries from the failure based on the countermeasure information are correspondingly stored; and a client device which is connected to said server;

wherein:

said first network device transmits to said server, a first event which contains first object to-be-monitored information indicating said device itself, and first status information indicating the status of said device itself;

said second network device transmits to said server, a second event which contains second object to-be-monitored information indicating said device itself, and second status information indicating the status of said device itself;

said server receives the first and second events, judges existence or nonexistence of the failure on the basis of the first status information and the second status information, and finds failure information;

said server searches for one or more countermeasure information items which correspond to the first and second object to-be-monitored information items respectively contained in the first and second events, and the found failure information, by reference to the scenario table, and selects from among the pertinent countermeasure information items, one countermeasure information item as to which the corresponding frequency information is the largest, or, is equal to or larger than a predetermined value;

said server transmits the selected countermeasure information item to said first and second network devices, respectively;

said first and second network devices receive the countermeasure information item, and reflect said countermeasure information item or alter their settings on the basis of the countermeasure information item, respectively;

when the failure is avoided, said server increases the frequency information item corresponding to the selected countermeasure information item, by reference to the scenario table;

said server notifies to said client device in a case where an unselected countermeasure information item has become nonexistent by repeatedly selecting pertinent countermeasure information items in the scenario table; and said client device displays on a display unit or outputs to an output unit, nonexistence of the countermeasure information.

6. A failure recovery system comprising:

a first network device constituting a network;

a second network device constituting the network;

a third network device connected to the network through said first network device, and connected to the network through said second network device;

a server connected to said first and second network devices, and including a memory storing a scenario table in which object to-be-monitored information that indicates the network device or devices being objects for failure recovery, failure information for identifying contents of failures, a plurality of countermeasure information items against each of the failures, and frequency information that indicates the number of times of recoveries from the failures based on the countermeasure information are correspondingly stored; and a client device which is connected to said server;

wherein:

when said third network device detects that a failure has occurred in a transfer to the network, due to the failure of said first or second network device, said third network device transmits to said server, a failure event which contains the object to-be-monitored information indicating said device itself, and failure information for identifying the failure of a transfer function;

said server receives the failure event, searches for one or more countermeasure information items corresponding to the object to-be-monitored information and the failure information which are contained in the failure event, by reference to the scenario table, and selects from among the pertinent countermeasure information items, one countermeasure information item as to which the corresponding frequency information is the largest, or, is equal to or larger than a predetermined value;

said server transmits the countermeasure information item to said first and second network devices in conformity with the selected countermeasure information item;

said first and second network devices receive the countermeasure information item, and reflect the countermeasure information item or alter their settings on the basis of the countermeasure information item;

when said server does not receive the failure event again within a predetermined time period since the transmission of the selected countermeasure information item, said server increases the frequency information corresponding to the selected countermeasure information item, by reference to the scenario table;

said server notifies to said client device in a case where an unselected countermeasure information item has become nonexistent by repeatedly selecting pertinent countermeasure information items in the scenario table; and said client device displays on a display unit or outputs to an output unit, nonexistence of the countermeasure information.

* * * * *